US012699011B2

(12) United States Patent
Abdo et al.

(10) Patent No.: US 12,699,011 B2
(45) Date of Patent: Aug. 4, 2026

(54) DUAL HEAT-FREEZE INDICATOR

(71) Applicant: Temptime Corporation, Morris Plains, NJ (US)

(72) Inventors: Mohannad Abdo, Clifton, NJ (US); Thaddeus Prusik, Stroudsburg, PA (US); Marielle K. Smith, Parlin, NJ (US)

(73) Assignee: Zebra Technologies Corporation, Lincolnshire, IL (US)

( * ) Notice: Subject to any disclaimer, the term of this patent is extended or adjusted under 35 U.S.C. 154(b) by 716 days.

(21) Appl. No.: 17/877,287

(22) Filed: Jul. 29, 2022

(65) Prior Publication Data

US 2024/0035902 A1 Feb. 1, 2024

(51) Int. Cl.
*G01K 11/18* (2006.01)

(52) U.S. Cl.
CPC .................................... *G01K 11/18* (2013.01)

(58) Field of Classification Search
CPC .......... G01K 11/18; G01K 11/12; G01K 3/04; B41J 2/375
USPC ........................................................ 116/216
See application file for complete search history.

(56) References Cited

U.S. PATENT DOCUMENTS

| | | | |
|---|---|---|---|
| 7,343,872 B2 | 3/2008 | Taylor et al. | |
| 7,490,575 B2 | 2/2009 | Taylor et al. | |
| 7,891,310 B2 | 2/2011 | Taylor et al. | |
| 8,122,844 B2 | 2/2012 | Smith et al. | |
| 8,128,872 B2 | 3/2012 | Lentz et al. | |

| | | | |
|---|---|---|---|
| 8,430,053 B2 | 4/2013 | Taylor et al. | |
| 9,297,706 B2 | 3/2016 | Smith et al. | |
| 9,841,381 B2 * | 12/2017 | Selvaganapathy | ..... G01N 21/78 |
| 10,031,086 B2 | 7/2018 | Prusik et al. | |
| 10,677,660 B2 * | 6/2020 | Yuasa | .................... G01K 11/16 |
| 11,131,656 B2 | 9/2021 | Prusik et al. | |
| 11,397,115 B2 * | 7/2022 | Tsubouchi | .............. G01K 3/04 |
| 11,426,974 B2 | 8/2022 | Abdo et al. | |
| 11,435,293 B2 | 9/2022 | Prusik et al. | |

(Continued)

FOREIGN PATENT DOCUMENTS

WO WO 2020205910 10/2020

OTHER PUBLICATIONS

Search Report and Written Opinion dated Nov. 3, 2023 issued for International PCT Application No. PCT/US2023/028794.

*Primary Examiner* — Kristina M Deherrera
*Assistant Examiner* — Evan Mancini

(57) ABSTRACT

A dual heat-freeze indicator and methods for making the same are disclosed. The dual heat-freeze exposure indicator includes a substrate, a low temperature indicator material provided in a first initial color state, a high temperature indicator material provided in a second initial color state, both supported by the substrate. The low temperature indicator material is configured to change from the first initial color state to a first exposed color state responsive to the indicator being exposed to a temperature below a low temperature threshold. The high temperature indicator material is configured to irreversibly change from the second initial color state to a second exposed color state responsive to the indicator being exposed to a temperature above a high temperature threshold. The low temperature indicator material returns from the exposed color state to the initial color state responsive to being exposed to a temperature above a reset temperature threshold.

23 Claims, 14 Drawing Sheets

(56)     References Cited

U.S. PATENT DOCUMENTS

| | | | |
|---|---|---|---|
| 11,435,294 B2 | 9/2022 | Abdo et al. | |
| 11,455,483 B2 | 9/2022 | Prusik et al. | |
| 11,579,128 B2 | 2/2023 | Abdo et al. | |
| 11,615,280 B2 | 3/2023 | Smith et al. | |
| 11,734,539 B2 | 8/2023 | Nudel et al. | |
| 11,738,587 B2 | 8/2023 | Smith et al. | |
| 2008/0110391 A1* | 5/2008 | Taylor | G01K 3/04 |
| | | | 374/E11.006 |
| 2011/0248224 A1 | 10/2011 | Lucht et al. | |
| 2012/0154349 A1 | 6/2012 | Daniel et al. | |
| 2012/0162339 A1 | 6/2012 | Ishii et al. | |
| 2013/0068155 A1* | 3/2013 | Patel | G01K 11/12 |
| | | | 116/216 |
| 2014/0044609 A1 | 2/2014 | Prusik et al. | |
| 2015/0368487 A1* | 12/2015 | Lane | C09D 7/40 |
| | | | 524/37 |
| 2017/0363479 A1 | 12/2017 | Harvey | |
| 2018/0321159 A1 | 11/2018 | Prusik et al. | |
| 2019/0346415 A1 | 11/2019 | Abdo et al. | |
| 2019/0382585 A1 | 12/2019 | Debrauwer et al. | |
| 2019/0383649 A1 | 12/2019 | Abdo et al. | |
| 2020/0003631 A1* | 1/2020 | Sambongi | G01K 3/005 |
| 2020/0370966 A1 | 11/2020 | Nemet et al. | |
| 2021/0034831 A1 | 2/2021 | Abdo et al. | |
| 2021/0396601 A1 | 12/2021 | Abdo et al. | |
| 2022/0057274 A1 | 2/2022 | Cho et al. | |
| 2022/0080763 A1 | 3/2022 | Smith et al. | |
| 2022/0112391 A1 | 4/2022 | Smith et al. | |
| 2022/0178761 A1 | 6/2022 | Huffman et al. | |
| 2022/0244108 A1 | 8/2022 | Abdo et al. | |
| 2022/0252464 A1 | 8/2022 | Huffman et al. | |
| 2022/0268640 A1 | 8/2022 | Bhatia et al. | |
| 2022/0283041 A1 | 9/2022 | Olson et al. | |
| 2022/0412933 A1 | 12/2022 | Millman et al. | |
| 2023/0114227 A1 | 4/2023 | Hofer et al. | |
| 2023/0126486 A1 | 4/2023 | Smith et al. | |

* cited by examiner

FIG. 3A
100
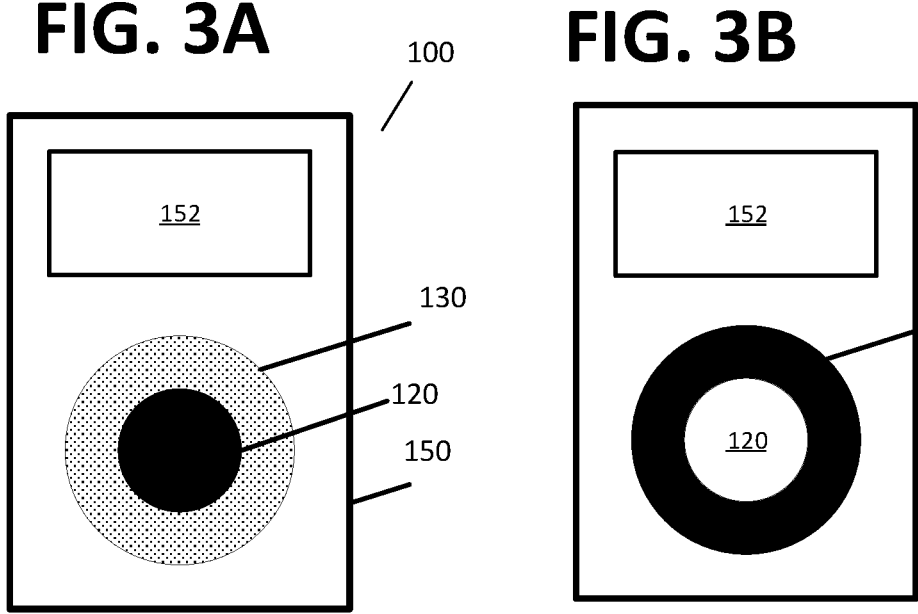
152
130
120
150
FIG. 3B
100
152
130
120
150
FIG. 3C
100
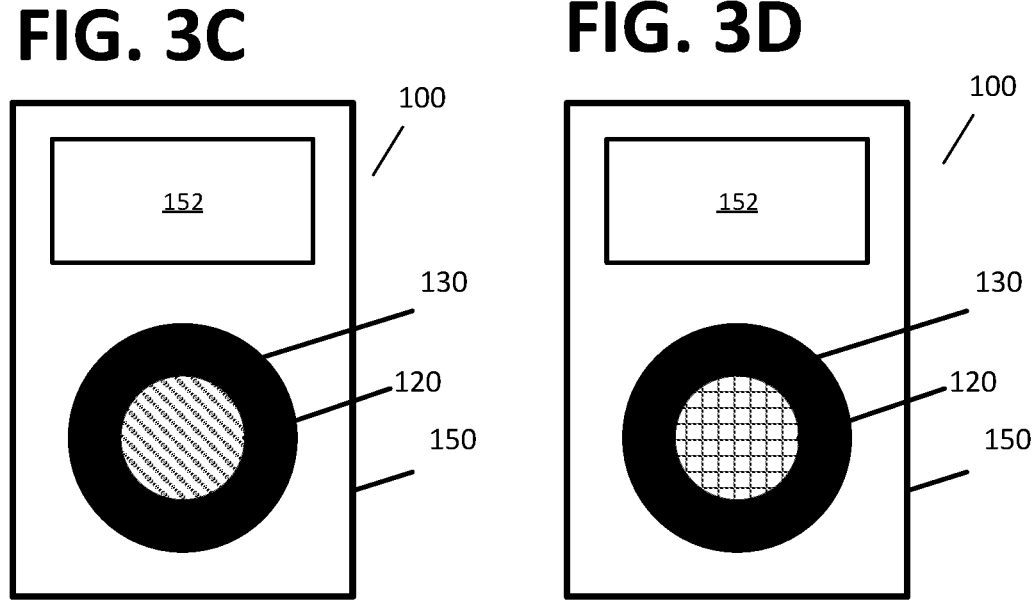
152
130
120
150
FIG. 3D
100
152
130
120
150

400

400

400

IF TWO BLACK LINES, EXPOSED ABOVE 70° C

FIG.12

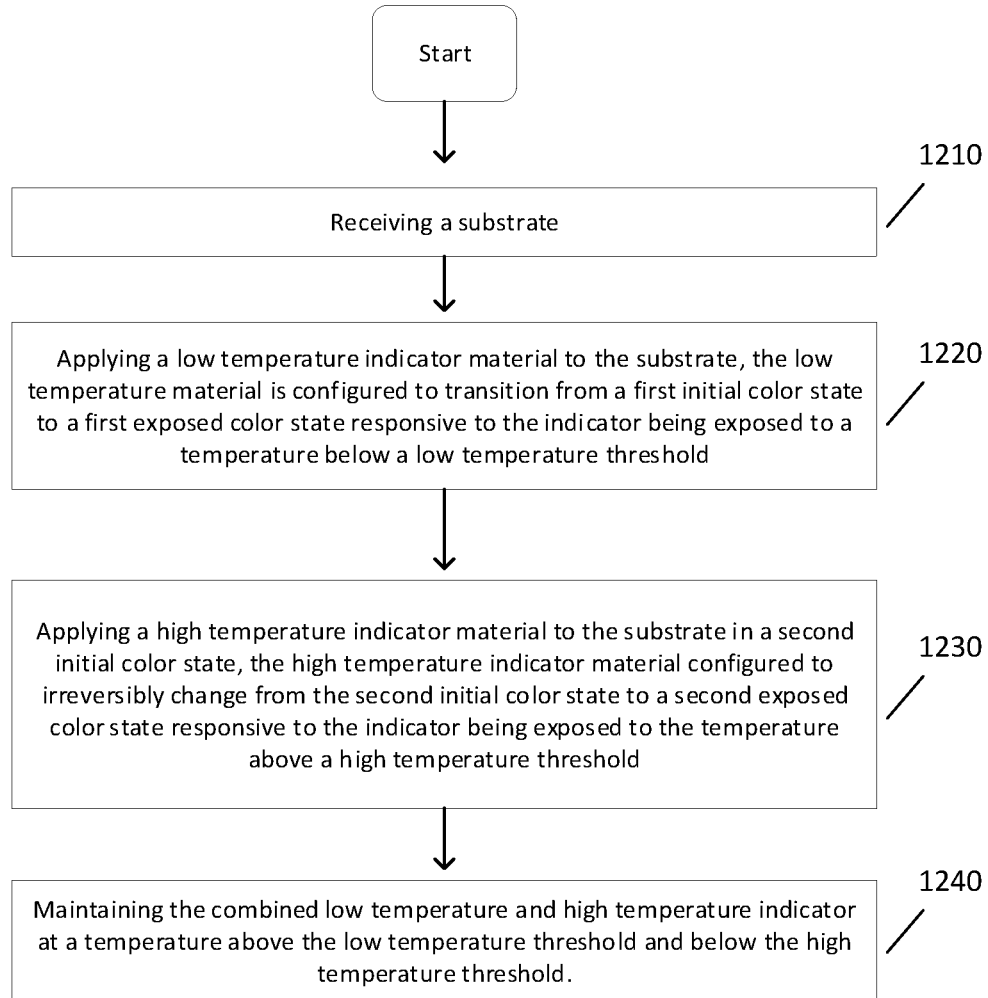

Start

Receiving a substrate                                                                    1210

Applying a low temperature indicator material to the substrate, the low           1220
temperature material is configured to transition from a first initial color state
to a first exposed color state responsive to the indicator being exposed to a
temperature below a low temperature threshold Applying a high temperature indicator material to the substrate in a second       1230
initial color state, the high temperature indicator material configured to
irreversibly change from the second initial color state to a second exposed
color state responsive to the indicator being exposed to the temperature
above a high temperature threshold Maintaining the combined low temperature and high temperature indicator          1240
at a temperature above the low temperature threshold and below the high
temperature threshold.

Graph 1

FIG. 15

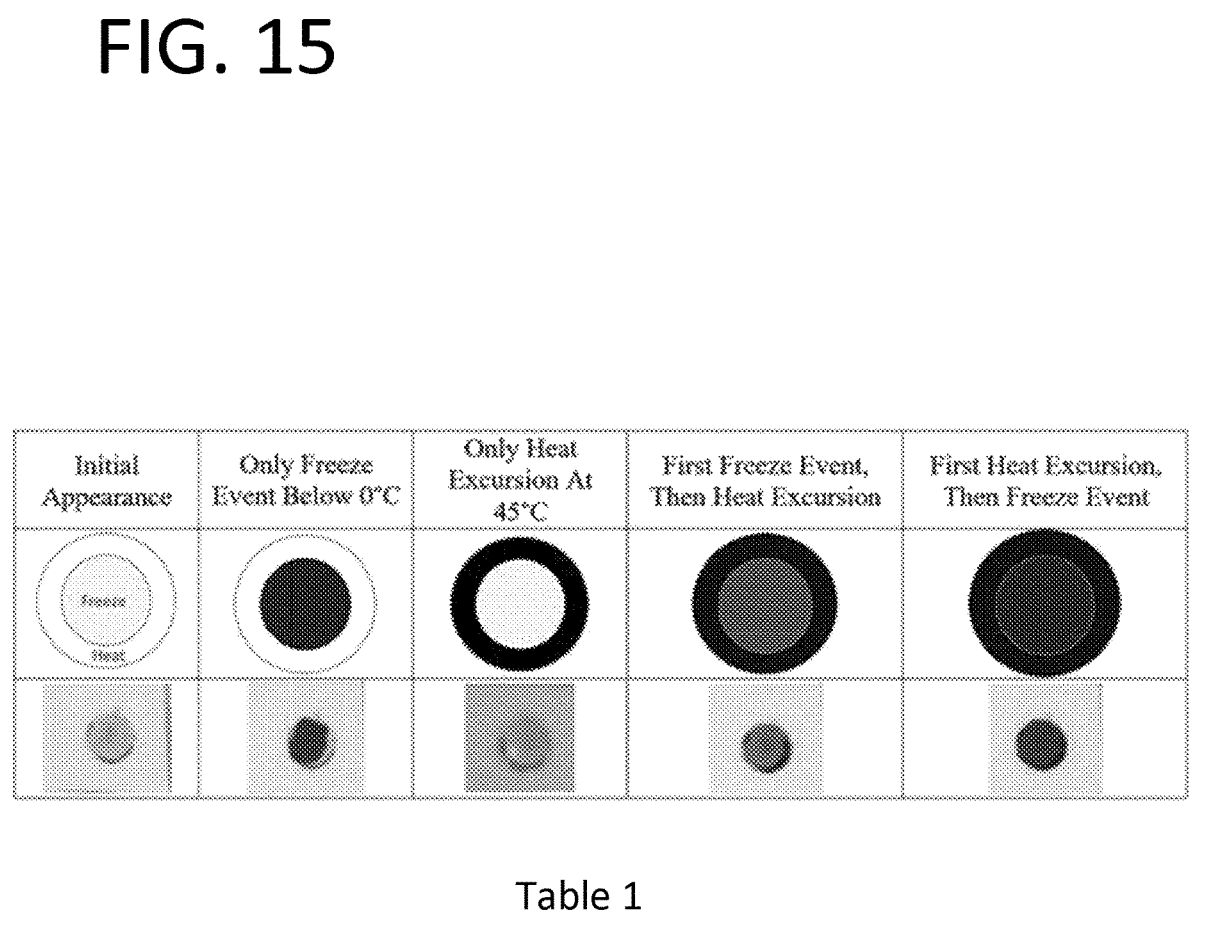

| Initial Appearance | Only Freeze Event Below 0°C | Only Heat Excursion At 45°C | First Freeze Event, Then Heat Excursion | First Heat Excursion, Then Freeze Event |
|---|---|---|---|---|

Table 1

| Room Temp | Frozen (-26C) | Heated to 53C after Freezing | Heated to 53C before Freezing | First Heated, Then Frozen | Heated to 65C |
|---|---|---|---|---|---|
| Opaque White | Opaque Dark Grey | Black | Transparent/ Colorless | Black | Transparent/ Colorless |
| OD Cyan: 0.102 | OD Cyan: 0.619 | OD Cyan: 1.799 | OD Cyan: 0.312 | OD Cyan: 1.678 | OD Cyan: 0.324 |

Table 2

DUAL HEAT-FREEZE INDICATOR

BACKGROUND

Many types of products are perishable under different environmental conditions. For example, products may be degraded or rendered unsafe or otherwise unusable by too much heat exposure cumulatively over time or peak heat exposure over a threshold that rapidly causes product deterioration, such as denaturing the proteins of a biologic product or thawing of a frozen product. Other products may be negatively impacted by being too cold, e.g., by freezing or other undesirable physical changed caused by too low a temperature. Many types of indicators are used to show historical exposure to environmental conditions, e.g., to low or too high a temperature, often in a visible manner, such as by change of color of an indicator material.

Certain types of thermochromic materials. Often referred to as memory thermochromic materials, exhibit semi-irreversible color changes in response to changing temperature. These materials exhibit a color changing hysteresis effect, changing to a high temperature color state when heated above a high temperature threshold, with the color state being maintained when the material returns to a temperature below that threshold. The material then changes to a low temperature color state only when the temperature reduces sufficiently far below a low temperature threshold. The material then remains in the low temperature color state until the material returns to a temperature above the high temperature threshold. For example the material may be light colored in the low temperature state and dark colored in the high temperature state, or vice versa, or the material may be transparent or invisible in the high temperature state, and colored or visible in the low temperature state, or vice versa.

Using a memory thermochromic indicator as a historical freeze indicator may be problematic if the monitored product may be problematic if a product may also be potentially exposed to high temperatures because such indicators are not irreversible. Exposure to high temperatures may reverse a freeze indication, returning the semi-irreversible indicator that has changed to a low temperature freeze indicating state back to its original state.

The present disclosure generally describes the use of semi-irreversible color changing materials to produce several types of customizable labels with dual heat and freeze exposure indication capabilities.

SUMMARY

Disclosed herein are customizable temperature exposure indicators and methods for making the same are disclosed. The temperature exposure indicator includes Aspects of the subject matter described herein may be useful alone or in combination with one or more other aspects described herein. In an aspect of the present disclosure, a temperature exposure indicator includes a substrate, a low temperature indicator material supported by the substrate and provided in a first initial color state, a high temperature indicator material supported by the substrate and provided in a second initial color state, wherein the low temperature indicator material changes from the first initial color state to a first exposed color state responsive to the indicator being exposed to a temperature below a low temperature threshold, the low temperature indicator material returns from the exposed color state to the initial color state responsive to the low temperature indicator material being subsequently exposed to a temperature above a reset temperature threshold and wherein the high temperature indicator material irreversibly changes from the second initial color state to a second exposed color state responsive to the indicator being exposed to a temperature above a high temperature threshold, where the high temperature threshold is lower than the reset temperature threshold.

In another aspect of the present disclosure, which may be used in combination with any other aspect or combination of aspects listed herein, at least a portion of the high temperature indicator material overlays at least portion of the low temperature indicator material or at least a portion of the low temperature material overlays at least a portion of the high temperature material.

In another aspect of the present disclosure, which may be used in combination with any other aspect or combination of aspects listed herein, the high temperature indicator material and the low temperature indicator material are located in separate regions on the substrate.

In another aspect of the present disclosure, which may be used in combination with any other aspect or combination of aspects listed herein, the low temperature indicator forms a central region and at least a portion of the high temperature indicator surrounds the central region.

In another aspect of the present disclosure, which may be used in combination with any other aspect or combination of aspects listed herein, the low temperature indicator is light colored and transparent in the first initial color state and dark colored and opaque in the first exposed color state, and wherein the high temperature indicator material is light colored and opaque in the second initial color state and transparent in the second exposed color state, a dark background provided behind the combined high and low temperature indicator, the combined indicator appearing dark when exposed to either a low temperature excursion below the low temperature threshold or a high temperature excursion above the high temperature threshold.

In another aspect of the present disclosure, which may be used in combination with any other aspect or combination of aspects listed herein, the low temperature indicator is transparent in the first initial color state and opaque in the first exposed color state; the high temperature indicator material is opaque in the second initial color state, and transparent in the second exposed color state.

In another aspect of the present disclosure, which may be used in combination with any other aspect or combination of aspects listed herein, a symbol is provided in the dark background that is readable by the human eye, wherein a visual indication provided by the low temperature indicator material affects the appearance of the symbol, and wherein the changed appearance of the low temperature indicator material when exposed to a temperature below a low temperature threshold, provides a different visible indication.

In another aspect of the present disclosure, which may be used in combination with any other aspect or combination of aspects listed herein, the high temperature indicator material and the low temperature indicator material are combined into a heterogeneous mixture.

In another aspect of the present disclosure, which may be used in combination with any other aspect or combination of aspects listed herein, the background contains an indicia visible after a high temperature excursion, that is hidden after a low temperature excursion or a reset.

In another aspect of the present disclosure, which may be used in combination with any other aspect or combination of aspects listed herein, the heterogeneous mixture is light colored or opaque in the first initial color state and a dark background area or indicia is provided on the substrate which is masked by the opacity of the heterogeneous mixture in the first initial color state and visible through the heterogeneous mixture when the heterogeneous mixture is exposed to a high temperature excursion.

In another aspect of the present disclosure, which may be used in combination with any other aspect or combination of aspects listed herein, a bar code symbol is provided in the dark background that is readable by an optical scanning device, wherein a visual indication provided by the low temperature indicator material affects the appearance of the bar code, and wherein the changed appearance of the low temperature indicator material when exposed to a temperature below a low temperature threshold, provides a different signal to the optical scanning device.

In another aspect of the present disclosure, which may be used in combination with any other aspect or combination of aspects listed herein, the low temperature threshold is in a range from about 5° C. to about −20° C., from about 0° C. to about −15° C., from about −5° C. to about 10° C., or from about −10° C. to about 5° C.

In another aspect of the present disclosure, which may be used in combination with any other aspect or combination of aspects listed herein, the high temperature threshold is in a range from about 35° C. to about 80° C., from about 45° C. to about 75° C., or from about 60° C. to about 70° C.

In another aspect of the present disclosure, which may be used in combination with any other aspect or combination of aspects listed herein, the reset temperature threshold is in a range from about 50° C. to about 100° C., from about 60° C. to about 90° C., from about 70° C. to about 80° C.

In another aspect of the present disclosure, which may be used in combination with any other aspect or combination of aspects listed herein, the lower temperature indicator material is a memory thermochromic composition that comprises at least one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments.

In another aspect of the present disclosure, which may be used in combination with any other aspect or combination of aspects listed herein, the high temperature indicator material comprises at least one of (i) an SCC Polymer; (ii) a water-based SCC polymer emulsion; (iii) liquid crystal; (iv) inorganic materials; (v) a diacetylene; (vi) an alkane; (vii) a wax; (viii) an ester; (ix) a micro-encapsulated leuco-dye; (x) microencapsulated leuco pigments.

In another aspect of the present disclosure, which may be used in combination with any other aspect or combination of aspects listed herein, the substrate further comprises at least of one material selected from the group consisting of (i) paper; (ii) polyester; (iii) nylon; (iv) vinyl; and (v) other synthetic polymers.

In another aspect of the present disclosure, which may be used in combination with any other aspect or combination of aspects listed herein, the substrate includes printed information identifying the location of the low temperature indicator material and the high temperature indicator material on the substrate.

In another aspect of the present disclosure, which may be used in combination with any other aspect or combination of aspects listed herein, the exposure indicator, includes a second high temperature indicator material supported by the substrate and provided in a third initial color state; and wherein a second high temperature indicator material configured to irreversibly change from the third initial color state to a third exposed color state responsive to the indicator being exposed to a temperature above a second high temperature threshold, wherein the second high temperature threshold is the same or lower than the reset threshold.

In another aspect of the present disclosure, which may be used in combination with any other aspect or combination of aspects listed herein, the first high temperature indicator material, the second high temperature indicator material and the low temperature indicator material overlay one another on the substrate.

In another aspect of the present disclosure, which may be used in combination with any other aspect or combination of aspects listed herein, the first high temperature indicator material, the second high temperature indicator material and the low temperature indicator material are located in separate regions on the substrate.

In another aspect of the present disclosure, which may be used in combination with any other aspect or combination of aspects listed herein, the second high temperature indicator material comprises at least one of (i) an SCC Polymer; (ii) a water-based SCC polymer emulsion; (iii) liquid crystal; (iv) inorganic materials; (v) a diacetylene; (vi) an alkane; (vii) a wax; (viii) an ester.

In another aspect of the present disclosure, which may be used in combination with any other aspect or combination of aspects listed herein, A method of creating a combined low temperature and high temperature historical temperature exposure indicator includes receiving a substrate, applying a low temperature indicator material to the substrate, the low temperature material is configured to transition from a first initial color state to a first exposed color state responsive to the indicator being exposed to a temperature below a low temperature threshold, the low temperature indicator material configured to return from the exposed color state to the initial color state responsive to the low temperature indicator material being subsequently exposed to a temperature above a reset temperature threshold, applying a high temperature indicator material to the substrate in a second initial color state, the high temperature indicator material configured to irreversibly change from the second initial color state to a second exposed color state responsive to the indicator being exposed to the temperature above a high temperature threshold, where the high temperature threshold is lower than the reset temperature threshold and maintaining the combined low temperature and high temperature indicator at a temperature above the low temperature threshold and below the high temperature threshold.

In another aspect of the present disclosure, which may be used in combination with any other aspect or combination of aspects listed herein, the low temperature indicator material is applied in the first initial color state.

In another aspect of the present disclosure, which may be used in combination with any other aspect or combination of aspects listed herein, the low temperature indicator material is applied in the exposed color state, and, after application, the low temperature indicator material is exposed to a temperature above the reset temperature, placing it in the high temperature state.

In another aspect of the present disclosure, which may be used in combination with any other aspect or combination of aspects listed herein, the low temperature indicator material is applied and exposed to the temperature above the reset temperature, prior to applying the high temperature indicator material.

In another aspect of the present disclosure, which may be used in combination with any other aspect or combination of aspects listed herein, In another aspect of the present disclosure, which may be used in combination with any other aspect or combination of aspects listed herein, the high temperature indicator material and the low temperature indicator material overlay one another on the substrate.

In another aspect of the present disclosure, which may be used in combination with any other aspect or combination of aspects listed herein, the high temperature indicator material and the low temperature indicator material are arranged in concentric circles on the substrate.

In another aspect of the present disclosure, which may be used in combination with any other aspect or combination of aspects listed herein, high temperature indicator material and the low temperature indicator material are combined into a heterogeneous mixture and the heterogeneous mixture occupies the same region on the substrate.

In another aspect of the present disclosure, which may be used in combination with any other aspect or combination of aspects listed herein, the low temperature indicator is light colored or transparent in the first initial color state and opaque in the first exposed color state; the high temperature indicator material is opaque white in the second initial color state, and transparent in the second exposed color state.

In another aspect of the present disclosure, which may be used in combination with any other aspect or combination of aspects listed herein, a dark background area or indicia is provided on the substrate which is masked by the opacity of the high temperature indicator material in the second initial color state and visible because of the transparency of the high temperature material when the high temperature indicator material is in the second exposed color state.

In another aspect of the present disclosure, which may be used in combination with any other aspect or combination of aspects listed herein, a symbol is provided in the dark background that is readable by the human eye, wherein the visual indication provided by the low temperature indicator material affects the appearance of the symbol, and wherein the changed appearance of the low temperature indicator material when exposed to a temperature below a low temperature threshold, provides a different visible indication.

In another aspect of the present disclosure, which may be used in combination with any other aspect or combination of aspects listed herein, a bar code symbol is provided in the dark background that is readable by an optical scanning device, wherein the visual indication provided by the low temperature indicator material affects the appearance of the bar code, and wherein the changed appearance of the low temperature indicator material when exposed to a temperature below a low temperature threshold, provides a different signal to the optical scanning device.

In another aspect of the present disclosure, which may be used in combination with any other aspect or combination of aspects listed herein, the low temperature threshold is in a range from about 5° C. to about –20° C., from about 0° C. to about –15° C., from about –5° C. to about 10° C., from about –10° C. to about 5° C.

In another aspect of the present disclosure, which may be used in combination with any other aspect or combination of aspects listed herein, the high temperature threshold is in a range from about 35° C. to about 80° C., from about 45° C. to about 75° C., from about 60° C. to about 70° C.

In another aspect of the present disclosure, which may be used in combination with any other aspect or combination of aspects listed herein, the reset temperature threshold is in a range from about 50° C. to about 100° C., from about 60° C. to about 90° C., from about 70° C. to about 80° C.

In another aspect of the present disclosure, which may be used in combination with any other aspect or combination of aspects listed herein, the lower temperature indicator material is a memory thermochromic composition that comprises at least one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments In another aspect of the present disclosure, which may be used in combination with any other aspect or combination of aspects listed herein, the high temperature indicator material comprises at least one of (i) an SCC Polymer; (ii) a water-based SCC polymer emulsion; (iii) liquid crystal; (iv) inorganic materials; (v) a diacetylene; (vi) an alkane; (vii) a wax; (viii) an ester, (ix) a micro-encapsulated leuco-dye; (x) microencapsulated leuco pigments.

In another aspect of the present disclosure, which may be used in combination with any other aspect or combination of aspects listed herein, the substrate further comprises at least of one (i) paper; (ii) polyester; (iii) nylon; (iv) vinyl; (v) other synthetic polymers.

In another aspect of the present disclosure, which may be used in combination with any other aspect or combination of aspects listed herein, the substrate includes printed information identifying the location of the low temperature indicator material and the high temperature indicator material on the substrate.

BRIEF DESCRIPTION OF THE FIGURES

Some example apparatus embodiments of the invention, and example procedures for making and using one or more example embodiments, are described in detail herein and by way of example, with reference to the accompanying drawings (which are not necessarily drawn to scale with regard to any internal or external structures shown) and in which like reference characters designate like elements throughout the several views, and in which:

FIG. 3A illustrates the indicator of claim 2, in a first exposed color state, according to an example of the present disclosure.

FIG. 3B illustrates the indicator of claim 2, in a second exposed color state, according to an example of the present disclosure.

FIG. 3C illustrates the indicator of claim 2 placed in the first exposed color state followed by being put in the second exposed color state, according to an example of the present disclosure.

FIG. 3D illustrates the indicator of claim 2 placed in the second exposed color state followed by being put in the first exposed color state, according to an example of the present disclosure.

FIG. 12 illustrates a block diagram illustrating the method of claim 23, according to an example of the present disclosure.

FIG. 15 shows Table 1, which includes experimental test results, according to an Example 1.

DETAILED DESCRIPTION OF EXAMPLE EMBODIMENTS

Figure 1A:
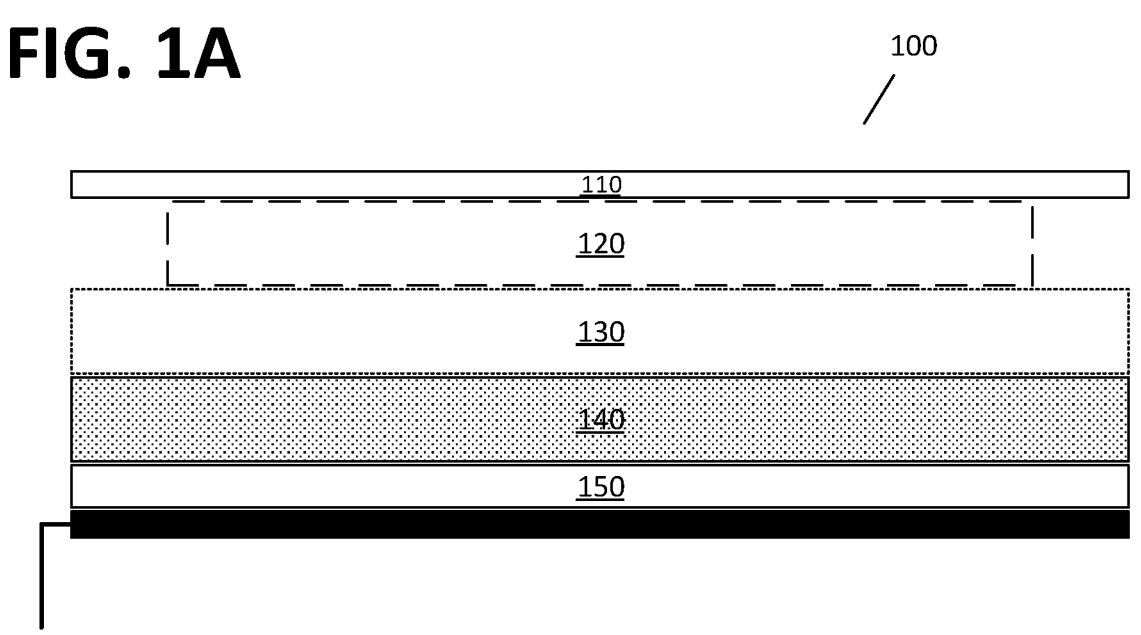
FIG. 1A illustrates a perspective view of the indicator of claim 2, according to an example of the present disclosure.

The present disclosure generally describes the use of semi-irreversible color changing materials to produce several types of customizable labels with dual high and low temperature exposure indication capabilities. A plurality of semi-irreversible color changing materials may be used to provide an easily discernable indication of exposure to a broad range of temperatures, alone or in combination with irreversible high temperature exposure indicators or other environmental exposure indicators. In one example, the plurality semi-irreversible color changing materials are provided on a substrate in various layers. In other examples, the plurality semi-irreversible color changing materials are combined and provided on the substrate in a heterogeneous mixture. Some of these indicators may be particularly suited for use with commercially available thermal printers, hand-held devices and data services. Additional benefits are achieved when thermally responsive components are imbedded into supplies and can be activated by printing customizable text depending on end-use application using commercially available thermal printers.

Additionally, techniques for creating a combined low temperature and high temperature historical temperature exposure label-like indicator are disclosed.

A need exists for an a single, label-like indicator having a compact profile that could be used to continually monitor temperature-sensitive products, for both heat and freeze events, while being transported and stored. Some examples of the present disclosure are small enough to be used for unit-level applications on individual products requiring temperature monitoring.

The disclosed approach may be employed with various types of semi-irreversible color changing materials that can provide easily discernable indication of exposure to a broad range of temperatures that can be interpreted by an end-user with little ambiguity.

As used herein, the term "low temperature threshold" means a temperature, usually a temperature below 0° C., that perishable products, such as a food or a vaccine are generally required to be maintained above, to avoid spoilage or maintain efficacy for extended periods. The threshold temperature may vary depending on the properties of the host product which is being monitored. A low temperature excursion is exposure of the product to temperatures below the low temperature threshold, possibly for a short time, or possibly for some minimum amount of time, e.g., long enough for the product or a product component to freeze or crystallize.

As used herein, the term "high temperature threshold" means a temperature, which when a perishable product is expose to a temperature above the threshold, that can cause damage or harm to the product, e.g., spoilage or reduced efficacy of the product. A high temperature excursion is exposure of the product to temperatures above the high temperature threshold, possibly for a short time, or possibly for some minimum amount of time. The high temperature threshold may vary depending on the nature of the host product, and the degradation mechanism that is being monitored. For example, the mechanism of concern may include thawing (temperatures above a threshold of about 0° C., although varying with the nature of the host product and/or the melting point of one of its components), failing to maintain proper refrigeration (temperatures above a threshold in the range of about 6° C.-15° C., depending on the product and/or refrigeration/storage protocol, or the product being allowed to overwarm in hot ambient conditions (temperatures thresholds from about 35° C. to about 60° C. In some cases the high temperature threshold may higher than normal ambient conditions, e.g., around 100 degrees C., or even higher.

As used herein, the term "reset temperature" refers to a temperature that returns a semi-irreversible indicator to its original state after it has changed from its original color state to a new color state; for example, a semi-irreversible indicator that changes color when cooled below a low temperature may return to its original color when it is exposed to a temperature above the reset temperature for that indicator.

As used herein, the term "thermochromic composition" refers to a composition or combination of compositions that possess the property of changing color state in response to a change in temperature.

As used herein, the term "color state" refers to an observable color including a change in hue, darkness, color intensity, opacity, fluorescence or phosphorescence, or other observable optical properties of the indicator material. The change in color state may be detectable by the unaided human eye, or may occur in a manner that requires machine detection, e.g., at wavelengths not visible to the unaided human eye.

As used herein, the term "permanent" refers to a color state that is stable and intended to remain substantially unchanged with respect to subsequent cooling and/or heating of the media. However, subsequent changes in the permanent color state, such as fading, due to conditions irrespective of temperature-responsive hysteresis properties of the composition, may occur. To the extent the visual appearance of the permanent color state changes over time, not necessarily dependent on temperature, there is an assumption this will not occur within the intended life of the device, or will only occur under abnormally extreme conditions (e.g., an indicator would not be expected to continue to function properly above a temperature where the underlying substrate fails or is degrades).

High Temperature Excursion Indicators

In the present disclosure, exemplified high temperature indicators include indicators that can be used to determine if a perishable product has been exposed to and/or maintained at temperature above an acceptable temperature or range of temperatures.

To signal past exposure to a temperature above a predetermined threshold, indicators according to the present disclosure usefully can have one observable appearance while the indicator is maintained at an acceptable range of temperatures below a high temperature threshold, and a different observable appearance after the indicator has been exposed to a temperature above the high temperature threshold. This observable change may include having an indicia appear that indicates the indicator has had a high temperature excursion, having an indicia indicating the indicator has not been exposed to such a low temperature disappear, or a change in color or other appearance of an indicia. This observable change can be provided by a thermochromic composition that changes color states in response to temperature exposure below the low temperature threshold.

Low Temperature Exposure Indicators

In the present disclosure, exemplified low temperature indicators include threshold temperature indicators that can be used to determine if a perishable product has been maintained at an acceptable temperature range or has been exposed to temperature excursion below a low temperature threshold, e.g., if the product has frozen.

To signal past exposure to a temperature below a predetermined temperature threshold, indicators according to the present disclosure usefully can have one observable appearance before exposure to a temperature at or below the threshold and a different observable appearance after exposure of the indicator. This observable change can be provided by the disappearance of an underlying thermochromic composition or indicia that was observable before the indicator was exposed to temperatures at or above the threshold temperature, the appearance of a warning or other indication that the temperature exposure has occurred, or a change in color or in the appearance of an indicia.

Indicator Materials

In the present disclosure, indicators for historical temperature exposure may be provided using semi-irreversible thermochromic compositions (also referred to as memory thermochromics because of their reversibility with a large hysteresis gap between the transitions). The memory thermochromic composition selected may be exhibit hysteresis—the phenomenon in which the value of a physical property lags behind changes in the effect causing it-between the low temperature color state and the high temperature color state of this system, e.g., color density, although it will be appreciated that any color state change that is detectable may be employed. These compositions are called memory thermochromics given they exhibit a large hysteresis curve.

When the indicator material is placed in a state above a high temperature threshold, it enters a high temperature color state, e.g., becoming light colored or invisible; although a dark high temperature color, state is also possible. It then remains light colored as the temperature is lowered below the high temperature threshold, until a low temperature threshold is approached or exceeded. At this time the material transitions to a low temperature color state, e.g., becoming dark. It will be appreciated that other color state transitions may also be possible, depending on the material. It then remains in the low temperature color state, e.g., dark, as the material is re-heated above the low temperature threshold, until it begins to approach or exceeds the high temperature threshold. The potential hysteresis of the memory thermochromic composition may be advantageously exploited in condition change indicators, such as ascending and descending temperature excursion indicators. Furthermore, given the potential hysteresis, remaining in a particular color state does not mean necessarily staying exactly the same color given a potential for variability in color density. The hysteresis is what advantageously provides the desired "memory" or "irreversibility" functionality. However, the color change from light to dark or dark to light may not be abrupt but rather may be either ranged or cumulative in nature which is what advantageously provides the potential for either cumulative or thermometer like functionality.

In the present disclosure, examples of the memory thermochromic composition may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the thermochromic composition may be one of leuco dye, a microencapsulated leuco-dye, microencapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof.

In an embodiment, the memory thermochromic composition may be one of polyoxymethylenemelamine, maleate polymer, ODB-II, Green DCF, Behenic acid methylester, resin, color modifier, bisphenol A derivative, leuco dye, and UV absorber. In an embodiment, the memory compositions may also be available in pigment powder form, water-based ink or slurry matrixes. For example, a water based slurry having the components: melamine formaldehyde resin, 3-diethylamino-6-methyl-7, 2, 4-xylidinofluoran, water, and aromatic ester may be used. Additionally, any commercially available semi-irreversible pigments and/or slurry/inks may be used, such as, UMC Slurry TM-MSL (0-50 Black & Blue), Insilico Spyball S 60 (slurry) (Blue, Black), Insilico Spyball P 60 (powder) (Blue, Black), LCR Hallcrest Slurry (0/50 Black, 0/40 Black, -5/65 Turquoise, -20/70C Blue), Matsui Thermolock pigment powders (0/60 Black, -15/40, -5/50, -25/70, -5/85) and/or CTI Blindspotz ink (−10/70, 0/40).

In an additional example, the high temperature material is a water-based SCC emulsion ink (such as used in LIMIT-marker I (a single-use immediate response heat indicator available from Zebra). Alternatively, the high temperature indicator material may include an active diacetylene compound configured to change its color state in response to cumulative heat exposure over time.

Multi-Layer Dual Indicator-Generally

Figure 1B:
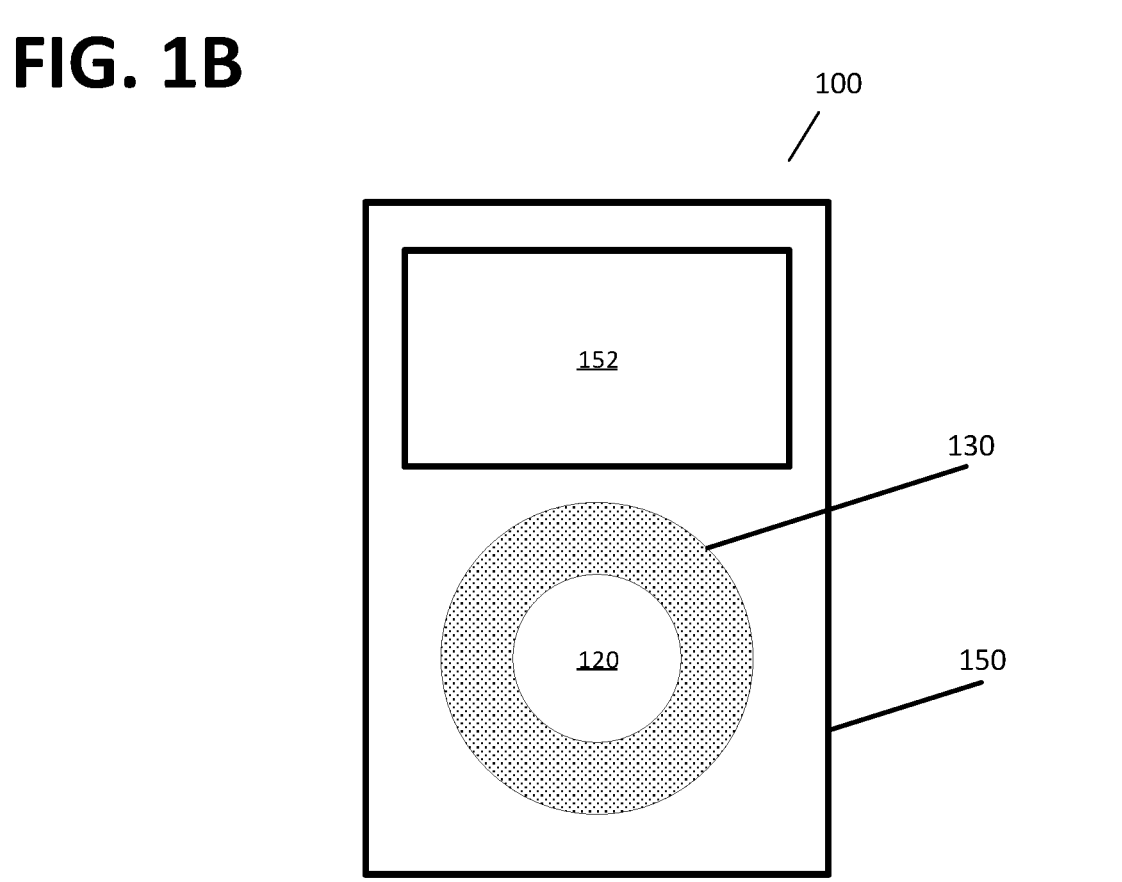
FIG. 1B illustrates the indicator of claim 2, at normal (e.g., room or refrigerated, depending on the application), according to an example of the present disclosure.

FIG. 1A illustrates a perspective view of a dual heat-freeze indicator, according to an example of the present disclosure. Additionally, FIG. 1B illustrates an example dual heat-freeze indicator, at normal (e.g., room or refrigerated, depending on the application) temperature, where at least a portion of the high temperature indicator material and a portion of the low temperature material overlay each other, according to an example of the present disclosure. Optionally, the substrate may contain conventional elements of a label-like substrate, e.g., an adhesive and liner to apply the indicator to products and a clear overlaminate file to protect the components of the indicator. In an example, a portion of the high temperature indicator material and a portion of the low temperature material overlay each other on the substrate, as shown in FIGS. 1A and 1B. Optionally, as illustrated in other figures, the high temperature indicator material and the low temperature indicator material are located in separate regions on the substrate.

Referring to FIG. 1A indicator 100 may include a substrate 150, a low temperature indicator material 120, a high temperature indicator material 130, and a topcoat ink layer 140, all of which are supported by the substrate 150. Optionally, a clear overlaminate film 110 may be provided to cover and protect the indicator components supported by the substrate. Additionally, an adhesive and liner layer 160 is optionally provided to adhere the disclosed indicator to an object such as a box of perishable items. The substrate 150 may be a material selected from the group consisting of (i) paper; (ii) polyester; (iii) nylon; (iv) vinyl; and (v) other synthetic polymers.

In an example, several different types and combinations of customizable shapes of indicators can be used, for example, circle, square, rectangle, triangle, etc. In an example, the low temperature indicator shape, having smaller dimensions than the high temperature indicator shape may be in the center of (or in an alternate position near) the high temperature indicator shape having a slightly larger dimension. For example, a 0.25-inch triangle (low temperature indicator) can be in the center of a 0.5-inch circle (high temperature indicator). In an additional example, a 3 mm diameter circle (low temperature indicator) can be placed inside the center of a 7 mm square (high temperature indicator).

In an embodiment of the present disclosure, the low temperature indicator material 120 is provided in a first initial color state wherein the low temperature indicator material changes from the first initial color state to a first exposed color state responsive to the indicator being exposed to a temperature below a low temperature threshold. (The material may either be manufactured so that it is in this state, or placed in this state when the indicator is printed and/or deployed.) The low temperature indicator material 120 is light colored and transparent in the first initial color state and dark colored and opaque in the first exposed state. The low temperature indicator material 120 returns from dark colored and opaque (the first exposed color state) to light colored and transparent (the first initial color state) responsive to the low temperature indicator material being subsequently exposed to a temperature above a reset temperature threshold. In an embodiment, the low temperature threshold is in a range from about 5° C. to about −20° C., from about 0° C. to about −15° C., from about −5° C. to about 10° C., or from about −10° C. to about 5° C.

In an embodiment, the lower temperature indicator material 120 is a memory thermochromic composition that may be one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments.

Still referring to FIG. 1A, in an embodiment of the present disclosure, the high temperature indicator material 130 is provided in a second initial color state where the high temperature indicator material irreversibly changes from the second initial color state to a second exposed color state responsive to the indicator being exposed to a temperature above a high temperature threshold but lower than the reset temperature threshold. The high temperature indicator material 130 is light colored and opaque in the second initial color state and transparent in the exposed color state. Once the indicator is deployed, depending on the relative values of the reset temperature of the low temperature indicator material and the high temperature indicator material, it may be impossible to reset the low temperature indicator material to its high temperature state without triggering the high temperature state of the high temperature indicator, thereby indicating a problem condition, even if the low temperature indicator has been frozen and later reset to its original state. In an embodiment, the high temperature threshold is in a range from about 35° C. to about 80° C., from about 45° C. to about 75° C., or from about 60° C. to about 70° C.

In an embodiment, the high temperature indicator material 130 may be one of (i) an SCC Polymer; (ii) a water-based SCC polymer emulsion; (iii) liquid crystal; (iv) inorganic materials; (v) a diacetylene; (vi) an alkane; (vii) a wax; (viii) an ester; (ix) a micro-encapsulated leuco-dye; (x) microencapsulated leuco pigments.

Referring to FIG. 1B, in an embodiment of indicator 100, at least a portion of the low temperature material 120 overlays at least a portion of the high temperature material 130 on the substrate 150. In an additional embodiment, at least a portion of the high temperature indicator material 130 overlays at least portion of the low temperature indicator material 120. Additionally, in an embodiment, the low temperature indicator 120 forms a central region and at least a portion of the high temperature indicator material 130 surrounds the central region on, both of which are support by the substrate 150. This example allows for simplified user differentiation between heat and freeze events above or below their respective temperature thresholds.

In an embodiment, the topcoat ink layer 140 is provided beneath both the high and low temperature indicator materials 130, 120. In this embodiment, after a high temperature excursion (above the high temperature threshold) has occurred, the high temperature indicator material transitions to the second exposed color state and appears dark. However, the dark appearance of the high temperature indicator material 130 in the second exposed color state is a result of the topcoat ink layer 140 becoming visible when the high temperature indicator material 130 becomes transparent by transitioning to the second exposed color state. In an additional embodiment, a symbol is provided in the dark topcoat ink layer 140 that is readable by the human eye. A visual indication provided by the low temperature indicator material 120 affects the appearance of the symbol, and the changed appearance of the low temperature indicator material 120 when exposed to a temperature below a low temperature threshold, provides a different visible indication. In additional embodiment, a bar code symbol is provided in the dark background of topcoat ink layer 140 that is readable by an optical scanning device. The visual indication provided by the low temperature indicator material 120 affects the appearance of the bar code. The changed appearance of the low temperature indicator material 120 when exposed to a temperature below a low temperature threshold provides a different signal to the optical scanning device.

Still referring to FIG. 1B, in an embodiment, the substrate 150 may also include a data region 152 that contains printed information identifying the location of the low temperature indicator material and the high temperature indicator material on the substrate 150, for example, in data region 152.

Figure 2A:
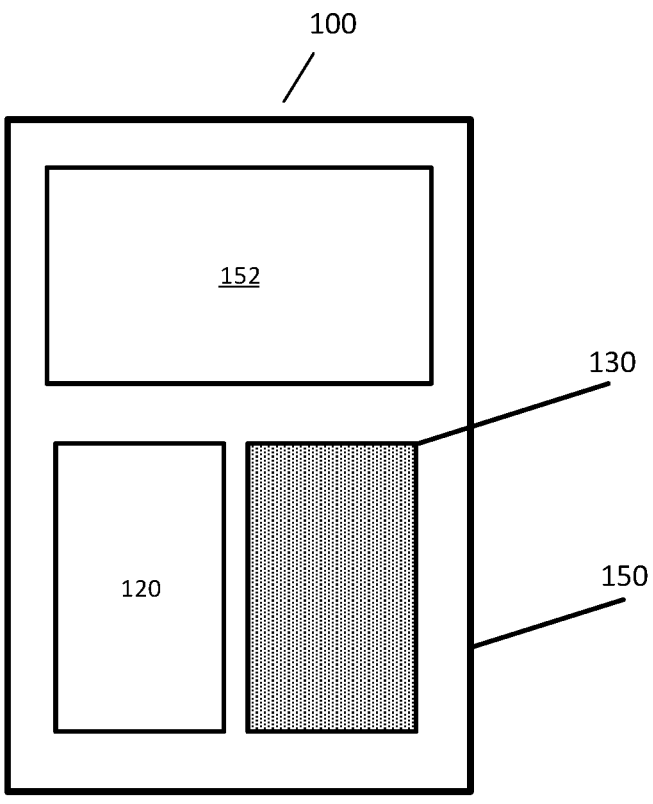
FIG. 2A illustrates the indicator of claim 3, at normal (e.g., room or refrigerated, depending on the application), according to an example of the present disclosure.
Figure 2B:
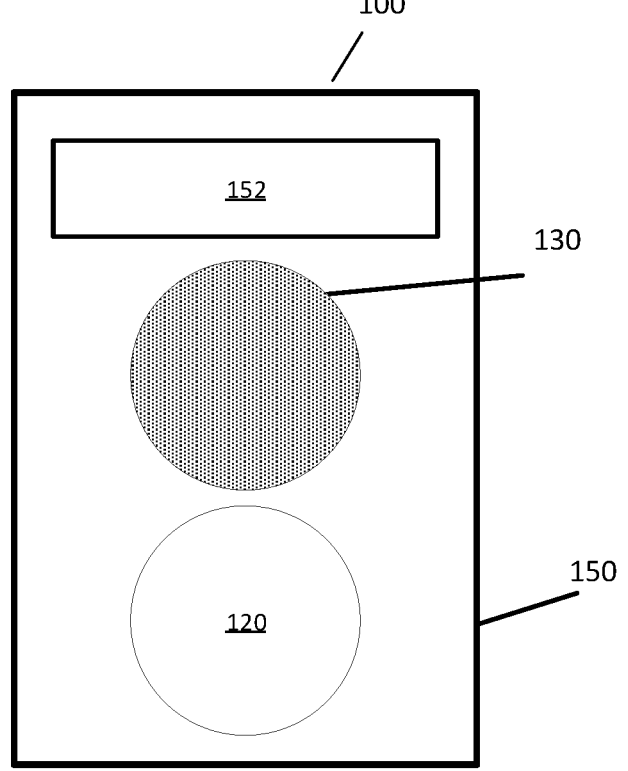
FIG. 2B illustrates an additional example of the indicator of claim 3 at normal (e.g., room or refrigerated, depending on the application), according to an example of the present disclosure.

FIGS. 2A and 2B illustrate example dual heat-freeze indicators, at norm (e.g., room, or refrigerated depending on the application) temperature, where the high temperature indicator material and low temperature indicator material are located in separate regions of the substrate, according to an example of the present disclosure. Referring to FIGS. 2A and 2B, the high temperature indicator material 130 and the low temperature indicator material 120 are located in separate regions on the substrate 150. Additionally, the substrate 150 may also include a data region 152 that contains printed information identifying the location of the low temperature indicator material and the high temperature indicator material on the substrate, for example, in data region 152. The high temperature indicator material 130 and the low temperature indicator material 120 may be provided on the substrate 150 in any desired shape or pattern. For example, as illustrated in FIGS. 2A and 2B, the high temperature indicator material 130 and the low temperature indicator material 120 are provided in separate regions on the substrate 150 in rectangles and circles, respectfully.

FIG. 3A illustrates an example dual heat-freeze indicator, in a first exposed color state responsive to exposure to a temperature below a low temperature threshold, where at least a portion of the high temperature indicator material and a portion of the low temperature material overlay each other, according to an example of the present disclosure. Referring to FIG. 3A, in an embodiment, the indicator 100 provides an indication of a freeze excursion below a low temperature threshold. The low temperature indicator material 120 is in the first exposed color state (dark colored or opaque) responsive to exposure to a temperature below a low temperature threshold. The high temperature indicator material 130 remains in the second initial color state (light colored and opaque) because the high temperature indicator material 130 has not been exposed to a temperature above a high temperature threshold. Therefore, the indicator 100 provides a simple and user-friendly indication that a freeze event has occurred but a heat event has not occurred.

FIG. 3B illustrates an example dual heat-freeze indicator, in a second exposed color state responsive to exposure to a temperature above a high temperature threshold, where at least a portion of the high temperature indicator material and a portion of the low temperature material overlay each other, according to an example of the present disclosure. Referring to FIG. 3B, in an embodiment, the indicator 100 provides an indication of a heat excursion above a high temperature threshold. The high temperature indicator material 130 is in the second exposed color state (transparent) responsive to exposure to a temperature above the high temperature threshold. As the high temperature indicator material 130 transitions from the second initial color state to the second exposed color state, becoming transparent, the topcoat ink layer 140 below (See FIG. 1A) the high temperature indicator material 130 becomes visible and provides a dark appearance. The low temperature indicator material 120 remains in the first initial color state (light colored and transparent) because the low temperature indicator material 120 has not been exposed to a temperature below the low temperature threshold. Therefore, the indicator 100 provides a simple and user-friendly indication that a heat event has occurred but a freeze event has not occurred.

FIG. 3C illustrates an example dual heat-freeze indicator, where the dual heat-freeze indicator has been exposed to a temperature below a low temperature threshold then exposed to a temperature above a high temperature threshold, where at least a portion of the high temperature indicator material and a portion of the low temperature material overlay each other, according to an example of the present disclosure. Referring to FIG. 3C, in an embodiment, the indicator 100 provides an indication of a freeze excursion below a low temperature threshold followed by a heat excursion above a high temperature threshold. The low temperature indicator material 120 is in the first exposed color state (dark colored or opaque) responsive to exposure to a temperature below a low temperature threshold. The high temperature indicator material 130 is in the second exposed color state (transparent) responsive to exposure to a temperature above the high temperature threshold exposing the topcoat ink layer 140 below (See FIG. 1A) providing a dark appearance. However, since a heat event occurred after the freeze event, the visual indication provided by the low temperature indicator material 120 is different than the first exposed color state and will appear grey (represented by the diagonal hatching). In an example, the first exposed color state appears grey because the low temperature indicator material 120 utilized is composed of materials that exhibit both black coloring and opaque white coloring depending on the exposure temperature. Therefore, the grey circle surrounded by the black circle allows the indicator 100 to provide a simple and user-friendly indication that a freeze event has occurred followed by a heat event. In cases where both heating and freezing events take place, the indicator is designed in such a way that the user can unambiguously discern whether a heat excursion or freeze event has occurred.

FIG. 3D illustrates an example dual heat-freeze indicator, where the dual heat-freeze indicator has been exposed to a temperature above a high temperature threshold then exposed to a temperature below a low temperature threshold, where at least a portion of the high temperature indicator material and a portion of the low temperature material overlay each other, according to an example of the present disclosure. Referring to FIG. 3D, in an embodiment, in an embodiment, the indicator 100 provides an indication of a heat excursion above a high temperature threshold followed by a freeze excursion below a low temperature threshold. The high temperature indicator material 130 is in the second exposed color state (transparent) responsive to exposure to a temperature above the high temperature threshold exposing the topcoat ink layer 140 below (See FIG. 1A) providing a dark appearance. Additionally, the low temperature indicator material 120 is in the first exposed color state (dark colored or opaque, represented by the checkered hatching) responsive to exposure to a temperature below a low temperature threshold. However, since the freeze event occurred after the heat event, the visual indication provided by the low temperature indicator material 120 is unaffected, unlike the embodiment of FIG. 3C. In an example, the first exposed color state appears grey because the low temperature indicator material 120 utilized is composed of materials that exhibit both black coloring and opaque white coloring depending on the exposure temperature. Therefore, the black circle (represented by the checkered hatching in FIG. 3D for clarity improvement purposes) surrounded by the black circle allows the indicator 100 to provide a simple and user-friendly indication that a heat event has occurred followed by a freeze event. In cases where both heating and freezing events take place, the indicator is designed in such a way that the user can unambiguously discern whether a heat excursion or freeze event has occurred.

Single Layer Dual Indicator-Generally

FIGS. 4A-B, 5A-D, 6-8 illustrate the structure and operation of an additional embodiment of the present disclosure. In this embodiment, the high temperature indicator material and the low temperature indicator material are combined into a heterogeneous mixture and the heterogeneous mixture is applied to a substrate in as a single layer. In this embodiment, the heterogeneous mixture is light colored or opaque in the first initial color state. Additionally, the heterogeneous mixture maintains its opacity, however, changes color to a dark grey when exposed to a freeze event. Also, the heterogeneous mixture becomes transparent when exposed to a high temperature excursion.

Figure 4A:
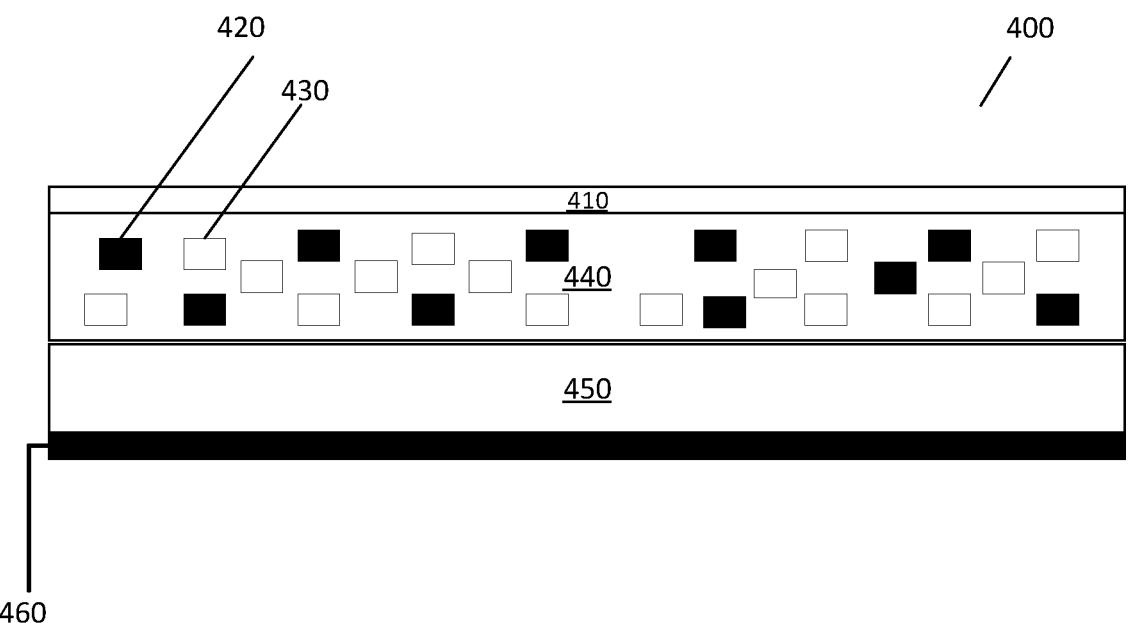
FIG. 4A illustrates a perspective view of the indicator of claim 8, according to an example of the present disclosure.

FIG. 4A illustrates a perspective view of a dual heat-freeze indicator, where the high temperature indicator material and the low temperature indicator material are combined into a heterogeneous mixture, according to an example of the present disclosure. Referring to FIG. 4A, indicator 400 may include a substrate 450, a low temperature indicator material 420 and a high temperature indicator material 430, the low temperature indicator material 420 and the high temperature indicator material 430 combined into a heterogeneous mixture 440, all of which are supported by the substrate 450. Optionally, a clear overlaminate film 410 may be provided to cover and protect the indicator components supported by the substrate. Additionally, an adhesive and liner layer 460 is optionally provided to adhere the disclosed indicator to an object such as a box of perishable items. The substrate 450 may comprise one material selected from the group consisting of (i) paper; (ii) polyester; (iii) nylon; (iv) vinyl; (v) polypropylene; (vi) PET; (vii) other thermoplastic resins and/or (vii) other synthetic polymers. Additionally, in an embodiment, the substrate may include a text, symbol or design that is selectively masked or revealed depending on the temperature exposure history of the indicator 400.

In an embodiment of the present disclosure, the heterogeneous mixture 440 is provided in a first initial color state (light colored and/or opaque) wherein the heterogeneous mixture 440 transitions to a first exposed color state responsive to the indicator being exposed to a temperature below a low temperature threshold. The heterogeneous mixture 440 is light colored and/or opaque in the first initial color state and dark colored and opaque in the first exposed state. In an embodiment, the low temperature threshold is in a range from about 20° C. to about –30° C., from about 0° C. to about –15° C., from about –5° C. to about 10° C., or from about –10° C. to about 5° C.

In an embodiment, the lower temperature indicator material 420, within the heterogeneous mixture 440, is a memory thermochromic composition that may be one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments.

Additionally, in an embodiment, the low temperature indicator material, as received, may be treated (pre-conditioned) by being heated to a temperature above the reset temperature prior to being combined with high temperature indicator material in order to create the heterogeneous mixture 440.

In an embodiment, the heterogeneous mixture 440 may be created by combining and mixing specific percentages of the low temperature indicator material 420 and high temperature indicator material 430 into a heterogeneous mixture. For example, the heterogeneous mixture 440 may contain 25% of low temperature indicator material and then combined with high temperature indicator material. In additional examples, the heterogeneous mixture 440 may contain between approximately 10-50% of low temperature indicator material as compared to high temperature indicator material.

Still referring to FIG. 4A, in an embodiment of the present disclosure, the heterogeneous mixture 440, changes from the first initial color state to a second exposed color state (transparent) responsive to the indicator being exposed to a temperature above a high temperature threshold. In an embodiment, the substrate 450 may include a dark background or an indicia visible when the heterogeneous mixture 440 becomes transparent after a high temperature excursion that is hidden after a low temperature excursion or a reset. The dark background area or indicia provided on the substrate is masked by the opacity of the heterogeneous mixture 440 in the first initial color state and visible through the heterogeneous mixture 440 when the heterogeneous mixture is exposed to a high temperature excursion. See FIGS. 5C-8.

In an embodiment, the high temperature threshold is in a range from about 35° C. to about 170° C., from about 45° C. to about 75° C., or from about 60° C. to about 70° C. In an embodiment, the high temperature indicator material 430, within the heterogeneous mixture 440, may be one of (i) an SCC Polymer; (ii) a water-based SCC polymer emulsion; (iii) liquid crystal; (iv) inorganic materials; (v) a diacetylene; (vi) an alkane; (vii) a wax; (viii) an ester; (ix) a micro-encapsulated leuco-dye; (x) microencapsulated leuco pigments.

Figure 4B:
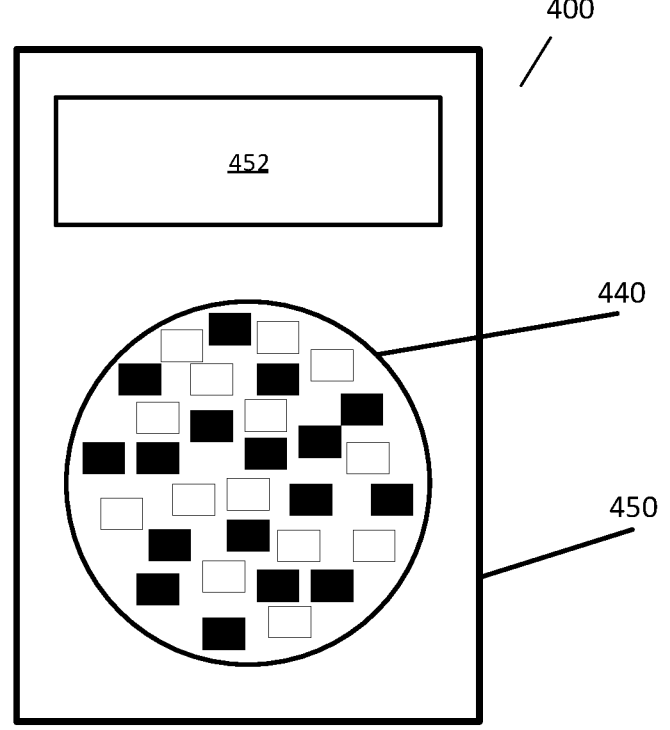
FIG. 4B illustrates an additional view of the indicator of claim 8, according to an example of the present disclosure.

FIG. 4B illustrates an example dual heat-freeze indicator, where the high temperature indicator material and the low temperature indicator material are combined into a heterogeneous mixture, according to an example of the present disclosure. Referring to FIG. 4B, in an embodiment, the indicator 400 includes the heterogeneous mixture 440 applied to the substrate 450. Additionally, the substrate 450 may also include a data region 452 that contains printed information identifying the location of the heterogeneous mixture 440 on the substrate, for example, in data region 452.

Figures 5A, 5B, 5C, 5D:
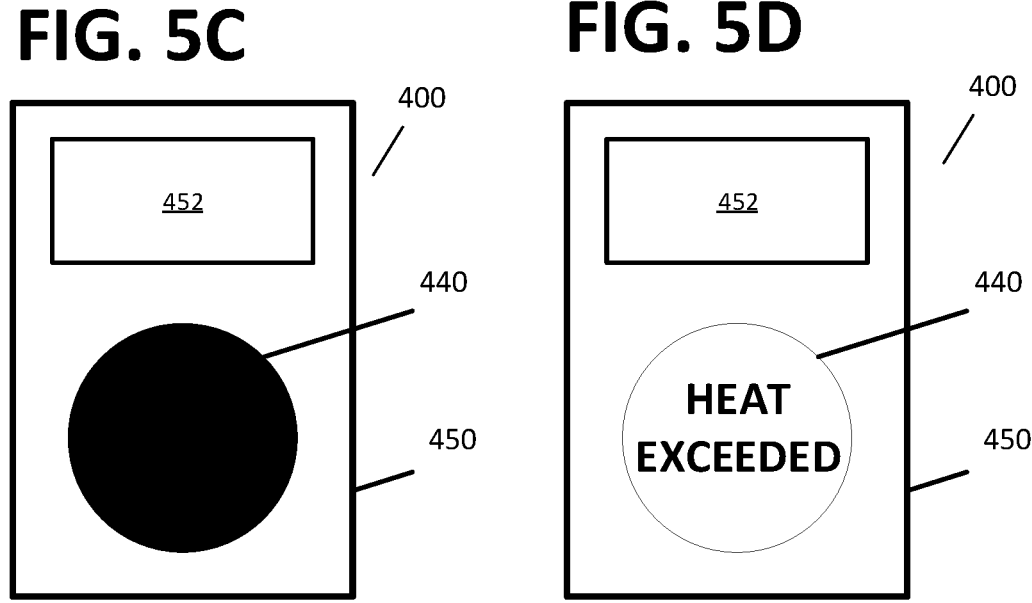
FIG. 5A illustrates the indicator of claim 8, at normal (e.g., room or refrigerated, depending on the application) temperature, according to an example of the present disclosure.
FIG. 5B illustrates the indicator of claim 8, where the dual heat-freeze indicator has been exposed to a temperature below a low temperature threshold temperature, according to an example of the present disclosure.
FIG. 5C illustrates the indicator of claim 8, where the dual heat-freeze indicator has been exposed to a temperature below a low temperature threshold then exposed to a temperature above a high temperature threshold, according to an example of the present disclosure.
FIG. 5D illustrates the indicator of claim 8, where the dual heat-freeze indicator has been exposed to a temperature above a high temperature threshold, according to an example of the present disclosure.

FIGS. 5A-5D illustrate the various color states of the indicator 400 in response to heat and freeze events, according to an example of the present disclosure. Specifically, FIG. 5A illustrates the example dual heat-freeze indicator 400, at normal (e.g., room or refrigerated, depending on the application) temperature. FIG. 5B illustrates the example dual heat-freeze indicator 400, where the dual heat-freeze indicator has been exposed to a temperature below a low temperature threshold temperature. FIG. 5C illustrates the example dual heat-freeze indicator 400, where the dual heat-freeze indicator has been exposed to a temperature below a low temperature threshold then exposed to a temperature above a high temperature threshold. FIG. 5D illustrates the example dual heat-freeze indicator 400, where the dual heat-freeze indicator has been exposed to a temperature above a high temperature threshold.

Referring first to FIG. 5A, the indicator 400 is at normal (e.g., room or refrigerated, depending on the application)

temperature and therefore, the heterogeneous mixture 440 of indicator 400 is in the first initial color state (light colored or opaque) because the indicator 400 not been exposed to a heat event above the high temperature threshold or a freeze event below the low temperature threshold.

Referring to FIG. 5B, the indicator 400 has been exposed to freeze event and therefore, the heterogeneous mixture 440 of indicator 400 is in the first exposed color state. As a result of the indicator 400 being exposed to a freeze event below the low temperature threshold, the heterogeneous mixture 440 transitioned from the first initial color state (light colored or opaque) to the first exposed color state (grey or opaque, illustrated by checkered hatching).

Referring to FIG. 5C, the indicator 400 has been exposed to freeze event followed by a heat event. In this embodiment, the heterogeneous mixture 440 of indicator 400 transitioned from the first initial color state to the first exposed color state, then to the second exposed color state. As a result of the indicator 400 being exposed to a freeze event below the low temperature threshold, followed by a heat event above the high temperature threshold, the heterogeneous mixture 440 transitioned to the second exposed color state (dark colored or opaque)

Lastly, referring to FIG. 5D, the indicator 400 has been exposed to a heat event and therefore, the heterogeneous mixture 440 of indicator 400 is in the second exposed color state. As a result of the indicator 400 being exposed to a heat event above the high temperature threshold, the heterogeneous mixture 440 transitioned from the first initial color state (light colored or opaque) to the second exposed color state (transparent) exposing the indicia visible on the substrate 450. The dark background area or indicia provided on the substrate 450 is masked by the opacity of the heterogeneous mixture 440 in the first initial color state and visible through the heterogeneous mixture 440 when the heterogeneous mixture is exposed to a high temperature excursion. The indicia on the substrate 450 can be customized based on the needs or preferences of the user. For example, a bar code symbol can be provided in the dark background that is readable by an optical scanning device.

Figure 6:
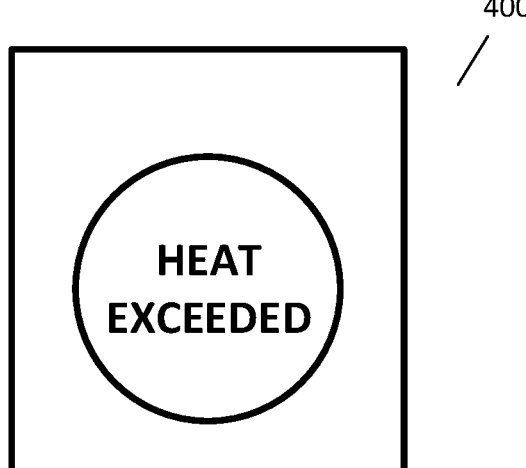
FIGS. 6, 7 and 8 illustrate various examples of the indicator of claim 9, according to an example of the present disclosure.
Figure 7:
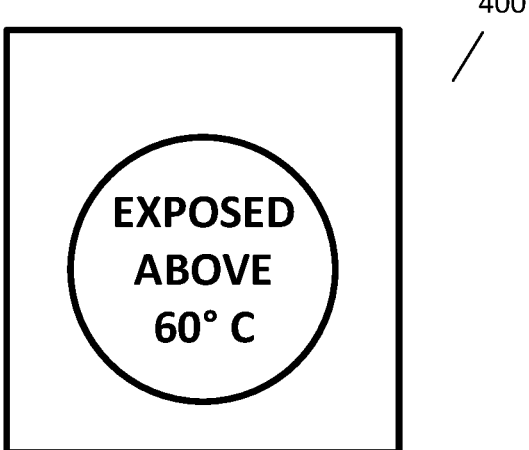
Figure 8:
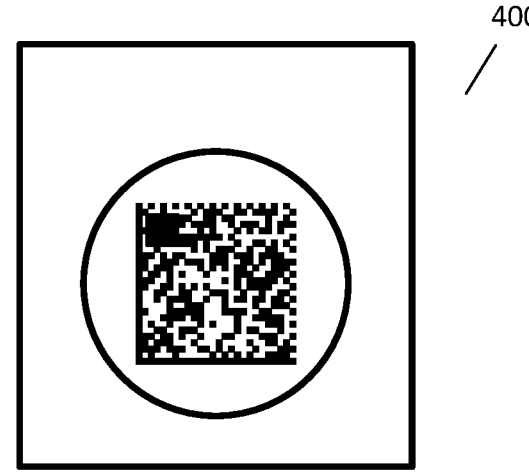

FIGS. 6, 7 and 8 illustrate various examples of the dual heat-freeze indicator 400, where the dual heat-freeze indicator has been exposed to a temperature above a high temperature threshold and various indicia are provided on the substrate, according to an example of the present disclosure.

Figure 14:
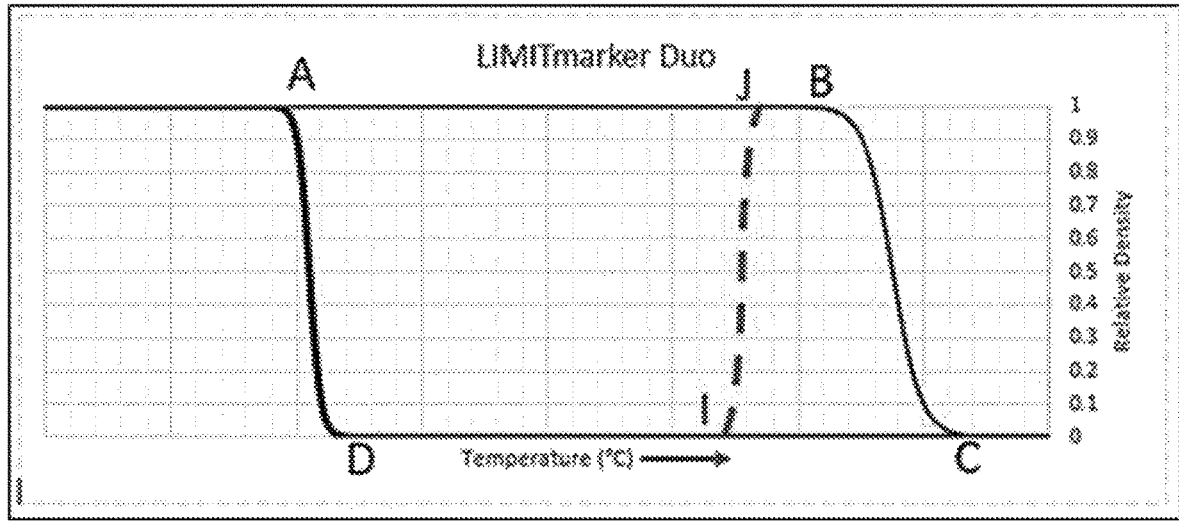
FIG. 14 show Graph 1, which illustrates temperature performance profiles of indicator materials, according to an example of the present disclosure.

Graph 1 (FIG. 14) illustrates the temperature performance profile of the high and low temperature indicator materials, generally, in the dual heat-freeze indicator according to an embodiment of the present disclosure.

In Graph 1, the x-axis represents temperature in degrees Celsius, increasing in temperature moving left to right. Specifically, temperatures below "I" are opaque and temperatures above "I" (i.e., "C") are transparent. Additionally, the y-axis represents relative density of the color state of the indicator material where a y-axis value of zero (0) equals light color/colorless and a y-axis value of one (1) equals dark color. The performance of the high temperature indicator material is illustrated by the dotted line, I→J. The performance of the low temperature indicator material is shown by the hysteresis ABCD diagram.

In the embodiment of the present disclosure, where the high and low temperature indicator materials are combined into a heterogeneous mixture, data points A through D represent the typical hysteresis behavior in a semi-irreversible (memory) thermochromic ink (low temperature indicator material) where data point A represents a dark color at or below threshold for low temperature indicator material (e.g., −5) C°; data point B represents start of low temperature indicator material change from dark color to light color/transparent (e.g., 55C); data point C represents a "reset" temperature of low temperature indicator material—light color & transparent (e.g., 65C); and data point D represents a start of low temperature indicator material change from light color/transparent to dark color (e.g., +5) C°. Additionally, data points J & I represent the irreversible SCC polymer behavior (high temperature indicator material) where I represents an opaque & white/colorless state below high temperature threshold temperature (e.g. 49) C.° and J represents a transparent state, exposing dark background/symbol/text OR when combined with low temperature indicator material, the overall appearance is dark color (e.g., 51) C°. When the two indicator materials are combined, that results in a dual temperature indicator that can monitor both heat (e.g., 50° C. +/−1° C.) and freeze (0° C. +/−5° C.) excursions. However if the indicator is ever exposed to temperature exceeding "J" (e.g. at temperatures above "B"), both high temperature & low temperature indicator materials will lose opacity and appear transparent which would expose the substrate (e.g. a pre-printed text/symbol/design or dark background color). Still referring to Graph 1, in an embodiment data point C is the "reset" temperature for the semi-irreversible (memory thermochromic) low temperature indicator material.

Plurality of High Temperature Indicator Materials

FIGS. 9A-B, 10A-B, and 11A-B illustrate the structure and operation of additional embodiments of the present disclosure. In these embodiments, the dual heat-freeze exposure indicator includes a second high temperature indicator material supported by the substrate to allow for a broader range of temperature exposure detection. In these embodiments, the second high temperature indicator material irreversibly changes from a third initial color state to a third exposed color state responsive to the indicator being exposed to a temperature above a second high temperature threshold. Additionally, in these embodiments, the first high temperature indicator material, the second high temperature indicator material and the low temperature indicator material overlay one another on the substrate. In an additional embodiment, the first high temperature indicator material, the second high temperature indicator material and the low temperature indicator material are located in separate regions on the substrate.

Figure 9A:
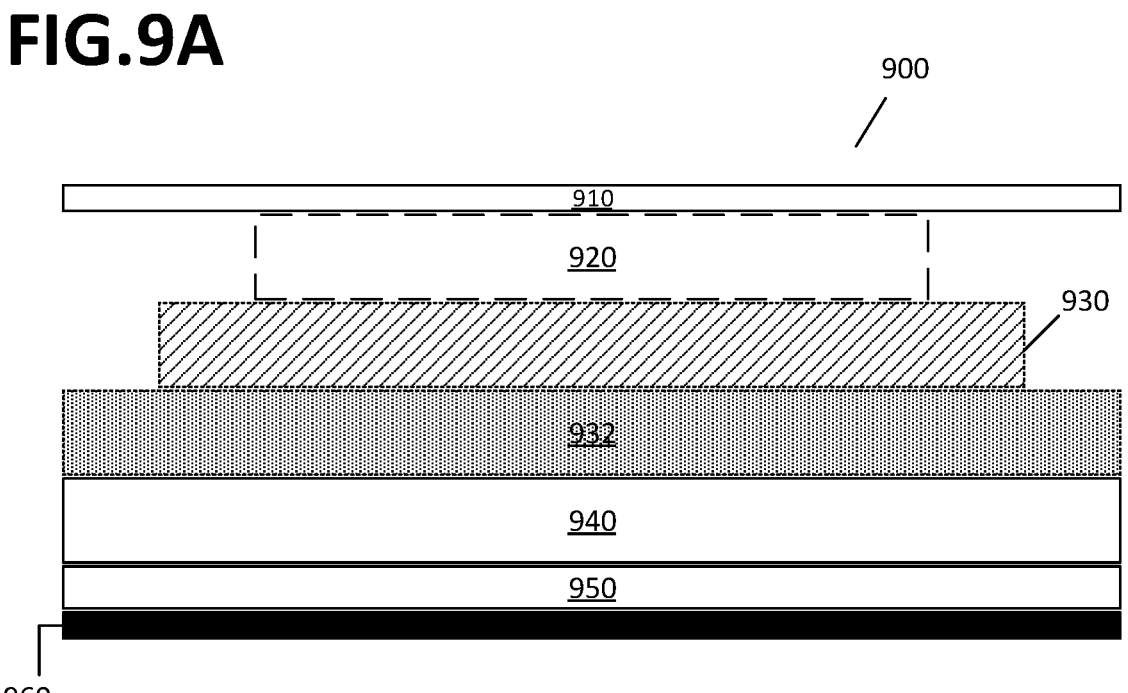
FIG. 9A illustrates a perspective view of the indicator of claim 20, according to an example of the present disclosure.

FIG. 9A illustrates a perspective view of a dual heat-freeze indicator, including a second high temperature indicator material, where at least a portion of the first high temperature indicator material, a portion of the second high temperature indicator material and a portion of the low temperature material overlay each other, according to an example of the present disclosure. Referring to FIG. 9A, indicator 900 may include a substrate 950, a low temperature indicator material 920, a first high temperature indicator material 930, a second high temperature indicator material 932, and a topcoat ink layer 940, all of which are supported by the substrate 950. Optionally, a clear overlaminate film 910 may be provided to cover and protect the indicator components supported by the substrate. Additionally, an adhesive and liner layer 960 is optionally provided to adhere the disclosed indicator to an object such as a box of perishable items. The substrate 950 may comprise one material selected from the group consisting of (i) paper; (ii) polyester; (iii) nylon; (iv) vinyl; and (v) other synthetic polymers.

In an embodiment of the present disclosure, the low temperature indicator material 920 is provided in a first initial color state wherein the low temperature indicator material changes from the first initial color state to a first exposed color state responsive to the indicator being exposed to a temperature below a low temperature threshold. The low temperature indicator material 920 is light colored and transparent in the first initial color state and dark colored and opaque in the first exposed state. The low temperature indicator material 920 returns from dark colored and opaque (the first exposed color state) to light colored and transparent (the first initial color state) responsive to the low temperature indicator material being subsequently exposed to a temperature above a reset temperature threshold. In an embodiment, the low temperature threshold is in a range from about 5° C. to about −20° C., from about 0° C. to about −15° C., from about −5° C. to about 10° C., or from about −10° C. to about 5° C. In an embodiment, the lower temperature indicator material 920 is a memory thermochromic composition that may be one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments.

Still referring to FIG. 9A, in an embodiment of the present disclosure, the first high temperature indicator material 930 is provided in a second initial color state wherein the first high temperature indicator material irreversibly changes from the second initial color state to a second exposed color state responsive to the indicator being exposed to a temperature above a high temperature threshold but lower than the reset temperature threshold. The high temperature indicator material 930 is light colored and opaque in the second initial color state and transparent in the exposed color state. In an embodiment, the high temperature threshold is in a range from about 35° C. to about 80° C., from about 45° C. to about 75° C., or from about 60° C. to about 70° C. In an embodiment, the first high temperature indicator material 930 may be one of (i) an SCC Polymer; (ii) a water-based SCC polymer emulsion; (iii) liquid crystal; (iv) inorganic materials; (v) a diacetylene; (vi) an alkane; (vii) a wax; (viii) an ester; (ix) a micro-encapsulated leuco-dye; (x) microencapsulated leuco pigments.

Additionally, still referring to FIG. 9A, indicator includes the second high temperature indicator material 932 supported by the substrate 950 and provided in a third initial color state. As illustrated in FIG. 9A, in an embodiment, at least a portion of the first high temperature indicator material 930, a portion of the second high temperature indicator material 932 and a portion of the low temperature material 920 overlay each other on the substrate 950. The second high temperature indicator material 932 irreversibly changes from the third initial color state (light colored or opaque) to a third exposed color state (transparent) responsive to the indicator 900 being exposed to a temperature above a second high temperature threshold. The second high temperature threshold can be the same or lower than the reset threshold. In an embodiment, the reset temperature threshold is in a range from about 50° C. to about 100° C., from about 60° C. to about 90° C., from about 70° C. to about 80° C. In an embodiment, the second high temperature indicator material 932 may be one of (i) an SCC Polymer; (ii) a water-based SCC polymer emulsion; (iii) liquid crystal; (iv) inorganic materials; (v) a diacetylene; (vi) an alkane; (vii) a wax; (viii) an ester.

In an embodiment, the topcoat ink layer 940 is provided beneath but the first and second high temperature materials

930, 932 and low temperature indicator materials 920. In this embodiment, after a high temperature excursion above both the high temperature thresholds has occurred, the both high temperature indicator materials transition to the second and third exposed color states, respectively and appears dark. However, the dark appearance of the first and second high temperature indicator materials 930 and 932 in the second and third exposed color states is a result of the topcoat ink layer 940 becoming visible. In an additional embodiment, a symbol is provided in the dark topcoat ink layer 940 that is readable by the human eye. A visual indication provided by the low temperature indicator material 920 affects the appearance of the symbol, and the changed appearance of the low temperature indicator material 920 when exposed to a temperature below a low temperature threshold, provides a different visible indication. In additional embodiment, a bar code symbol is provided in the dark background of topcoat ink layer 940 that is readable by an optical scanning device. The visual indication provided by the low temperature indicator material 920 affects the appearance of the bar code. The changed appearance of the low temperature indicator material 920 when exposed to a temperature below a low temperature threshold provides a different signal to the optical scanning device.

Figure 9B:
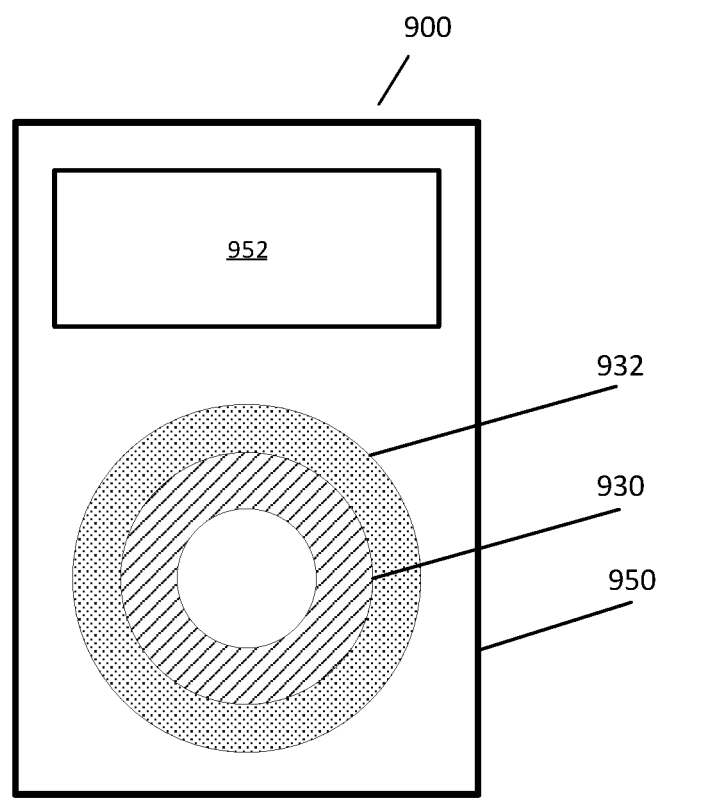
FIG. 9B illustrates the indicator of claim 20, according to an example of the present disclosure.

FIG. 9B illustrates an example dual heat-freeze indicator, including a second high temperature indicator material, where at least a portion of the first high temperature indicator material, a portion of the second high temperature indicator material and a portion of the low temperature material overlay each other, according to an example of the present disclosure. Referring to FIG. 9B, in an embodiment, the substrate 950 may also include a data region 952 that contains printed information identifying the location of the low temperature indicator material 920 and the first and second high temperature indicator materials 930, 932 on the substrate 950, for example, in data region 952.

Figure 10A:
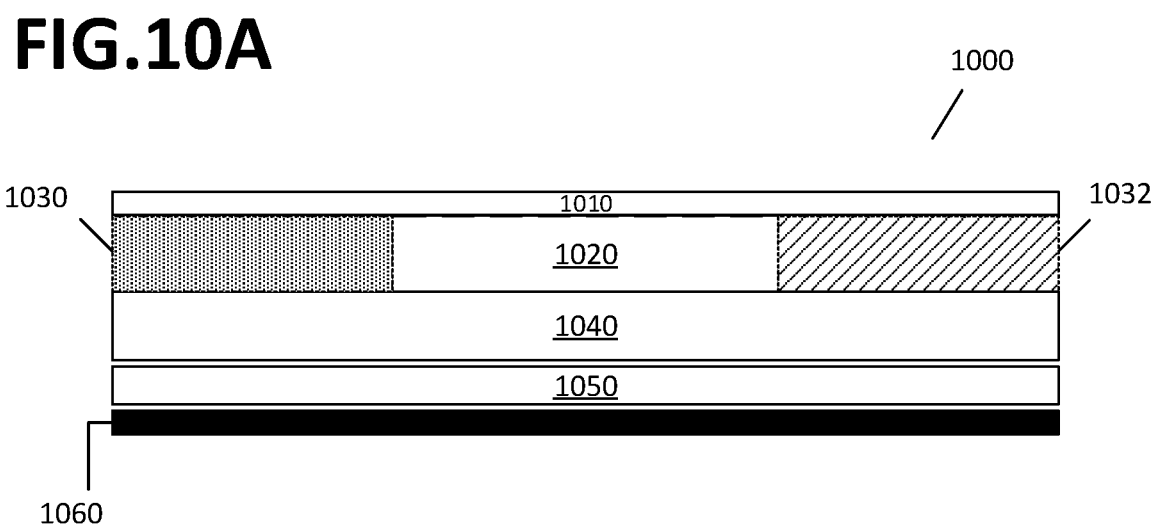
FIG. 10A illustrates a perspective view of the indicator of claim 21, according to an example of the present disclosure.

FIG. 10A illustrates a perspective view of a dual heat-freeze indicator, including a second high temperature indicator material, where the first high temperature indicator material and the second high temperature indicator material are located in separate regions on the substrate, according to an example of the present disclosure. Referring to FIG. 10A, in an embodiment, the first high temperature indicator material 1030, the second high temperature indicator material 1032 and the low temperature indicator material 1020 are located in separate regions on the substrate 1050.

Figure 10B:
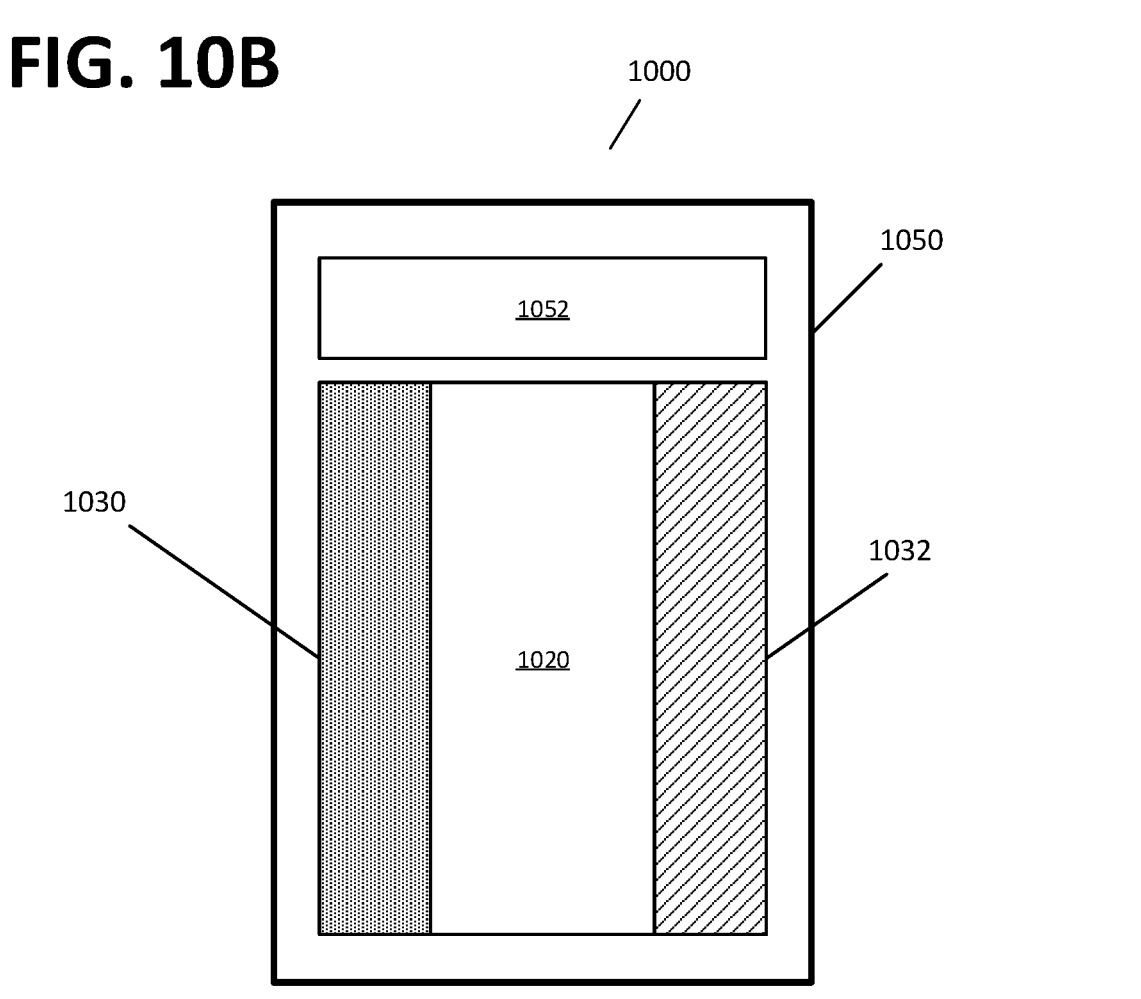
FIG. 10B illustrates an example of the indicator of claim 21, according to an example of the present disclosure.

FIG. 10B illustrates an example dual heat-freeze indicator, including a second high temperature indicator material, where the first high temperature indicator material and the second high temperature indicator material are located in separate regions on the substrate, according to an example of the present disclosure. Referring to FIG. 10B, the substrate 1050 may also include a data region 1052 that contains printed information identifying the location of the low temperature indicator material 1020 and the first and second high temperature indicator materials 1030, 1032 on the substrate 1050, for example, in data region 1052.

Figure 11A:
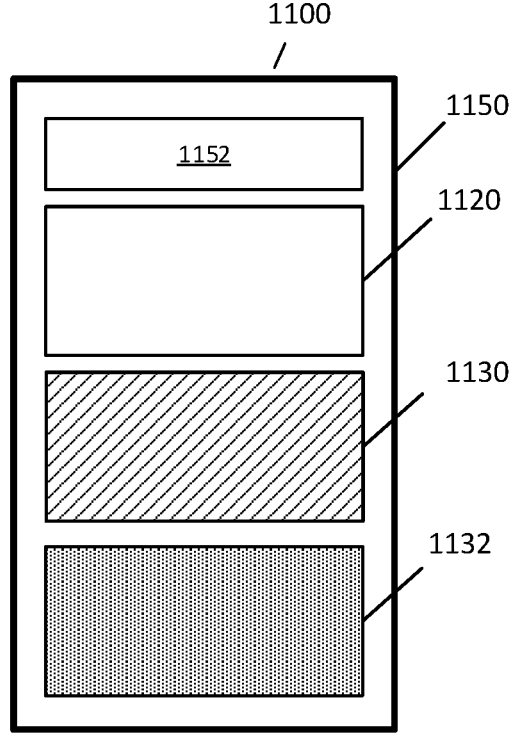
FIGS. 11A and 11B illustrate an additional example of the indicator of claim 21, according to an example of the present disclosure.
Figure 11B:
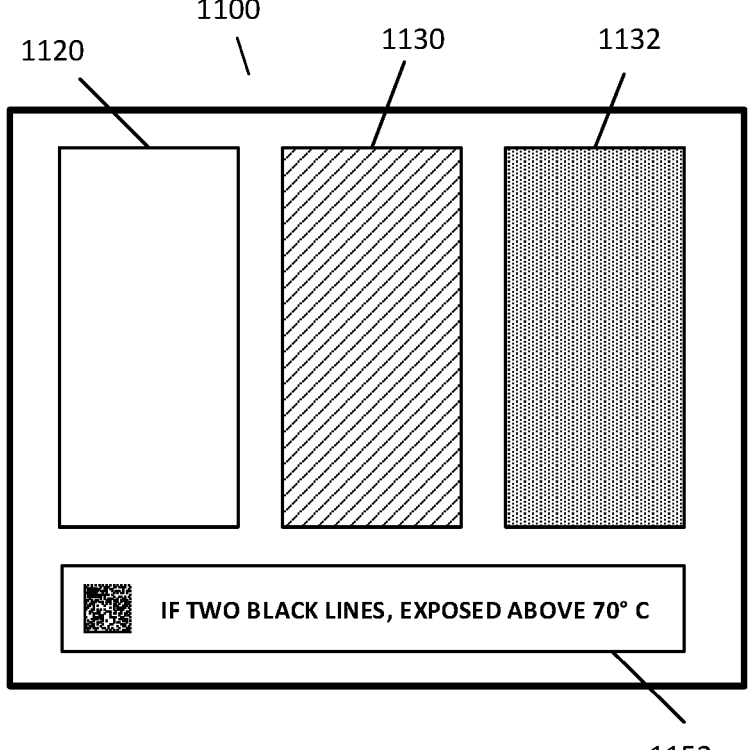

FIGS. 11A and 11B illustrate example dual heat-freeze indicators, including a second high temperature indicator material, where the first high temperature indicator material, the second high temperature indicator material and the low temperature material are located in separate regions on the substrate and where the substrate includes printed information identifying the indicator materials on the substrate, according to an example of the present disclosure. The indicator 1100 illustrated in FIGS. 11A and 11B are similar to indicator 1000 illustrated in FIGS. 10A-10B. However, the spacing between the first high temperature indicator material 1130, the second high temperature indicator material 1132 and the low temperature indicator material 1120 is slightly larger. Additionally, referring specifically to FIG. 11B, data region 1152 provides a specific example of the type of information that may be included in the data region to aid the user in reading the indicator 1100.

Method of Creating a Dual High-Low Temperature Indicator

FIG. 12 illustrates a block diagram illustrating a method for creating a dual heat-freeze exposure indicator, according to an example of the present disclosure. Referring to FIG. 12, in block 1210 a substrate is received. For example, the substrate may be a material selected from the group consisting of (i) paper; (ii) polyester; (iii) nylon; (iv) vinyl; and (v) other synthetic polymers. In block 1220, the method includes applying a low temperature indicator material to the substrate, the low temperature material transitions from a first initial color state to a first exposed color state responsive to the indicator being exposed to a temperature below a low temperature threshold. In an embodiment, he low temperature indicator material may be a memory thermochromic composition that comprises at least one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments. In an embodiment, the low temperature threshold may be in a range from about 5° C. to about −20° C., from about 0° C. to about −15° C., from about −5° C. to about 10° C., or from about −10° C. to about 5° C.

In block 1230, the method includes applying a high temperature indicator material to the substrate in a second initial color state, the high temperature indicator material irreversibly changes from the second initial color state to a second exposed color state responsive to the indicator being exposed to the temperature above a high temperature threshold. In an embodiment, the high temperature indicator material may be one of (i) an SCC Polymer; (ii) a water-based SCC polymer emulsion; (iii) liquid crystal; (iv) inorganic materials; (v) a diacetylene; (vi) an alkane; (vii) a wax; (viii) an ester; (ix) a micro-encapsulated leuco-dye; (x) microencapsulated leuco pigments. In an embodiment, the high temperature threshold may be in a range from about 35° C. to about 80° C., from about 45° C. to about 75° C., or from about 60° C. to about 70° C. In an embodiment, the reset temperature threshold is in a range from about 50° C. to about 100° C., from about 60° C. to about 90° C., from about 70° C. to about 80° C.

In block 1240, the method includes maintaining the combined low temperature and high temperature indicator at a temperature above the low temperature threshold and below the high temperature threshold.

In an embodiment, the method includes the low temperature indicator material being applied in the first initial color state. In an embodiment, the method includes, the low temperature indicator material being applied in the exposed color state, and, after application, the low temperature indicator material is exposed to a temperature above the reset temperature, placing it in the high temperature state. In an embodiment, the method includes, the low temperature indicator material being applied and exposed to the temperature above the reset temperature, prior to applying the high temperature indicator material. In an embodiment, the high temperature indicator material and the low temperature indicator material overlay one another on the substrate. In an embodiment, the high temperature indicator material and the low temperature indicator material are arranged in concentric circles on the substrate. In an embodiment, the high temperature indicator material and the low temperature indicator material are combined into a heterogeneous mixture and the heterogeneous mixture occupies the same region on the substrate.

In an embodiment, the low temperature indicator is light colored or transparent in the first initial color state and opaque in the first exposed color state; the high temperature indicator material is opaque white in the second initial color state, and transparent in the second exposed color state. In an embodiment, a dark background area or indicia is provided on the substrate which is masked by the opacity of the high temperature indicator material in the second initial color state and visible because of the transparency of the high temperature material when the high temperature indicator material is in the second exposed color state. In an embodiment, a symbol is provided in the dark background that is readable by the human eye, wherein the visual indication provided by the low temperature indicator material affects the appearance of the symbol, and wherein the changed appearance of the low temperature indicator material when exposed to a temperature below a low temperature threshold, provides a different visible indication. In an embodiment, the substrate includes printed information identifying the location of the low temperature indicator material and the high temperature indicator material on the substrate.

Dual High-Low Temperature Indicator Used with a Reader

Figure 13:
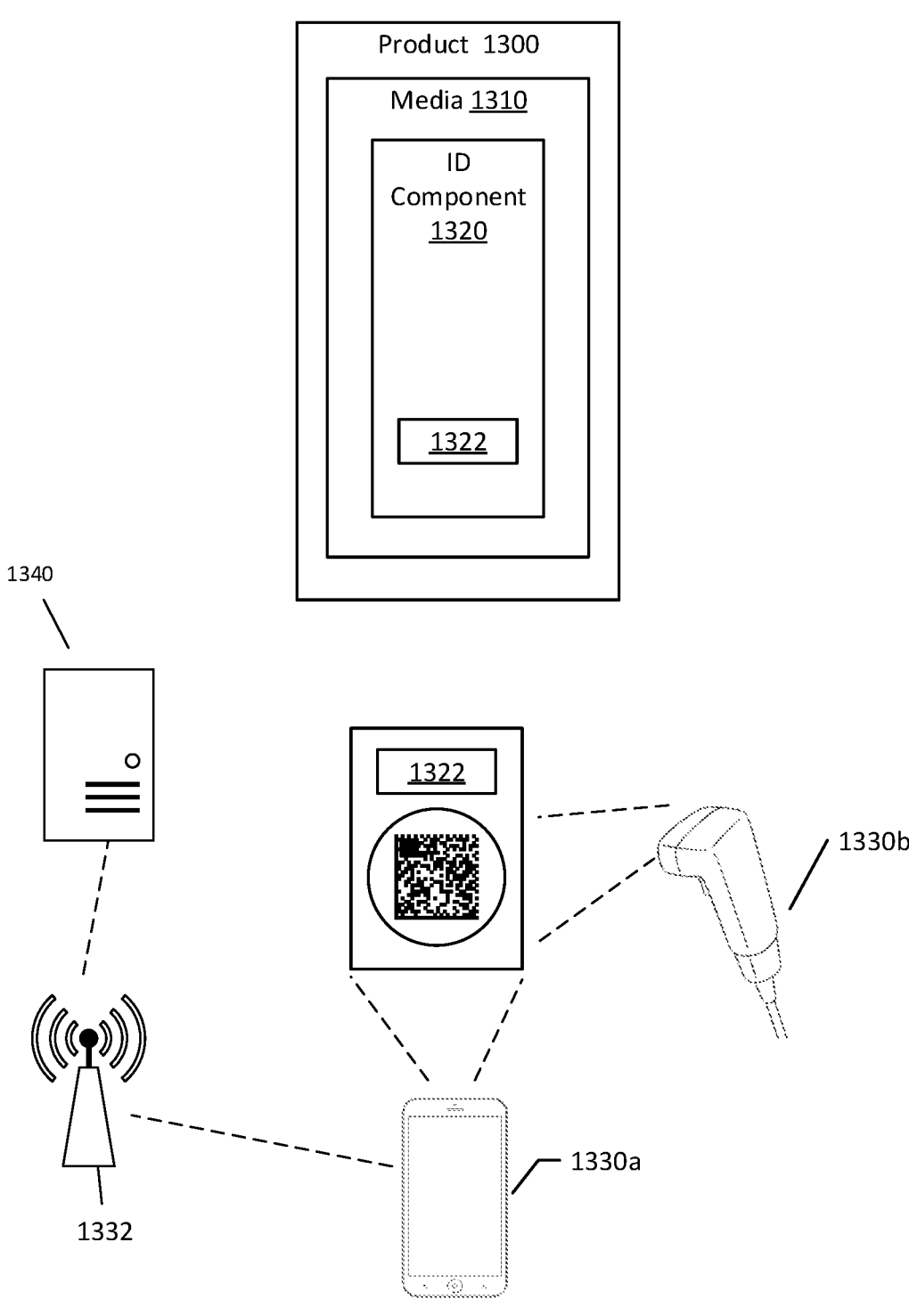
FIG. 13 illustrates a detailed view of a reader being utilized with an indicia of the dual heat-freeze exposure indicator, according to an example of the present disclosure.

In an embodiment, a bar code symbol is provided in the dark background on the substrate of the dual heat-freeze indicator that is readable by an optical scanning device. In this embodiment, the visual indication provided by the low temperature indicator material affects the appearance of the bar code and the changed appearance of the low temperature indicator material when exposed to a temperature below a low temperature threshold, provides a different signal to the optical scanning device. FIG. 13 illustrates a detailed view of a reader being utilized with an indicia of the dual heat-freeze exposure indicator, according to an example of the present disclosure. Referring to FIG. 13, an example product 1300 that includes a media 1310 fixed to the product 1300 including an ID component 1320 and the associated ID data 1322. The reader 1330 may also read calibration data associated with the ID component 1322. The reader 1330 may be a dedicated reader (e.g., reader 1330*b*) or an apparatus that reads an ID component 1330*b* (e.g., reader 1330*b*) such as a mobile device, a personal digital assistant or PDA, a smartphone, a laptop, a tablet computer, or a desktop computer, as well as any other user devices. In a more specific example, reader 1330 may be a Scanner provided by Zebra, such as any of the Zebra scanners or handheld computers (e.g., Zebra's EC50 and EC55 Enterprise Mobile Computers, MC2200 and MC2700, TC21 and TC26, etc.).

The reader 1330 may be adapted to read ID components 1320 with various indicia, such as machine-readable symbols (e.g., 1D, 2D barcodes and/or data matrixes). Additionally, the reader 1300 may also transmit, receive, or exchange data with other network devices via a communication network 1332. A network device may be a computer, a different reader 1330, or any other device accessible via a communication network. Certain data may be stored in the reader 1330, which may also be stored on a server within the network, either temporarily or permanently, for example in memory or a memory device 1340. The network connection may be any type of network connection, such as a cellular or wireless connection, an Ethernet connection, digital subscriber line, telephone line, coaxial cable, etc. Access to a reader 1330 or image data obtained by the reader 1330 may be controlled by appropriate security software or security measures. An individual users' access may be defined by reader 1330 and limited to certain data and/or actions.

For example, when a product 1300 is received, the reader 1330 is used to scan an ID component 1320 and the associated ID data 1322. The reader 1330 communicates with the memory device 1340 via a communication network 1332. Responsive to the specific ID data 1322 received, the memory device 1340 stores the data encoded in the ID data 1322 associatively with the data corresponding to product 1300 for later retrieval via the communication network 1332.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

EXPERIMENTAL RESULTS

Experiment 1:

The experimental results of the present disclosure are provided in Table 1 (FIG. 15), including photographs of the experimental results.

In Experiment 1, the low temperature indicator material utilized was a water-based memory slurry (0° C./50° C.) from United Mineral & Chemical Corp ("UMC") dispensed as a dot on to a small section of clear adhesive tape. Additionally, the high low temperature indicator material utilized was a 40° C. LIMITmarker I (water-based SCC emulsion from Zebra) immediate indicator applied on polypropylene film then placed into an oven at 70° C. for 10 minutes (using a Thermo Scientific, model Heratherm OGS180). The color of the high temperature indicator material. changed from dark grey/black to colorless (white), and upon removal from the oven, the colorless appearance was maintained. In Experiment 1, the substrate utilized was clear adhesive tape on polypropylene film.

In Experiment 1, the overall dimensions of the indicator was a circular shape less than 6 mm in diameter. The low temperature indicator material was applied in a circular shape with a diameter of 2.0 mm and the high temperature indicator material was in applied in a circular shape with a diameter of 3.0 mm, and is slightly larger than the circular shape of the low temperature indicator material.

Observations (by the human eye and captured via photographs) were made during Experiment 1 for color change after the following events:

(i) upon freezing after placing sample inside a freezer (phcbi Biomedical Freezer, model MDF-U731-PA) maintained at or below −26° C. for 5 minutes: the sample appearance white/colorless center with black outer ring is then frozen at −26° C. the where center changes from white to black.

(ii) upon heating the indicator using a Teca temperature control plate (Teca Cooling and Heating Plate, model AHP-1200CPV) set to 45° C. for 10 minutes: black center with opaque white outer ring is then heated at 45° C., the black center turns grey. At the same time, the outer circle/ring changes from opaque white to transparent, revealing black background.

The indicator design of Experiment 1, using two concentric dots, allows for differentiation between heat or freeze events. While indicator appearance looks slightly different depending on whether a freeze event or a heat excursion occurs first, the color change upon heating and freezing is sufficiently ambiguous for a trained end user to interpret correctly.

Figure 16:
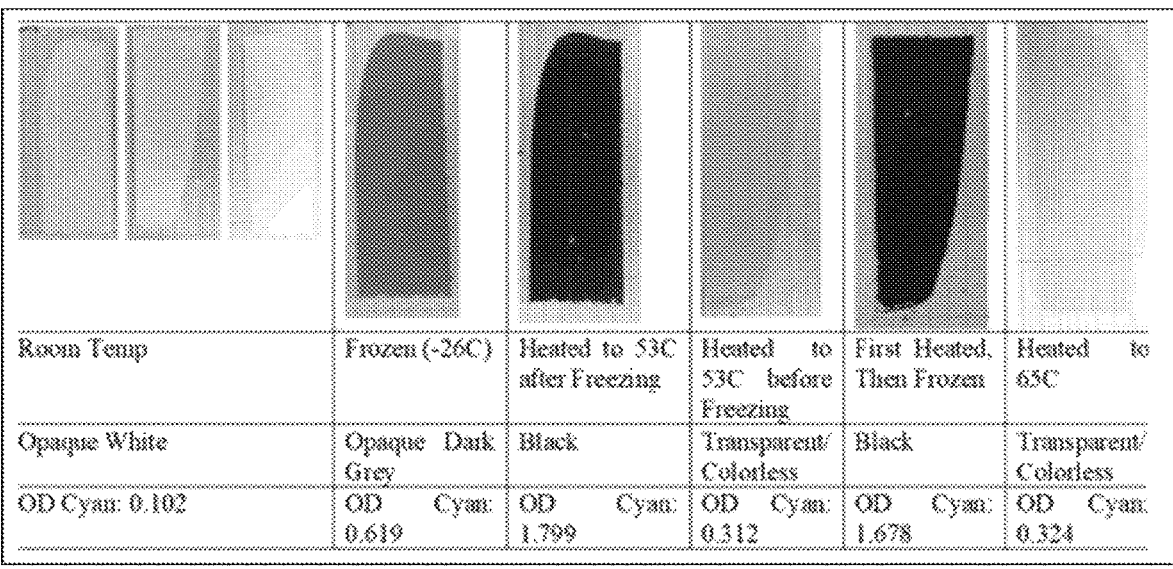
FIG. 16 shows Table 2, which includes experimental test results, according to Example 2.

Experiment 2:

The experimental results of the present disclosure are provided in Table 2 (FIG. 16), including photographs of the experimental results.

In Experiment 2, a 50° C. SCC water-based emulsion (heat responsive) was combined with a 0° C./60° C. Spyball Black Water-based memory slurry from Insilico into a heterogeneous mixture. The mixture comprises 20% WB memory slurry in 50° C. SCC emulsion. Specifically, the Spyball Black WB slurry was placed inside a small 10 mL scintillation vial, and was placed inside a 70° C. oven for at least 30 minutes (Thermo Scientific, model Heratherm OGS180). The ink changed from black to colorless/white. The colorless Spyball WB slurry was then added (20%) into 50° C. SCC emulsion water-based polymer and mixed thorough by stirring by hand. The combined ink coating was uniform, and appears opaque white/colorless at room temperature. This combined ink was coated onto three (3) 7.0 mil PET testing sheets and a piece of white lined paper was placed beneath the ink coated PET sheet (to confirm white opacity at room temperature).

Observations (by the human eye and captured via photographs) were made during Experiment 2 for color change after the following events:

(i) Initial pre-conditioning inside oven at 70° C. for at least 30 minutes (Thermo Scientific, model Heratherm OGS180).

(ii) Freezing: prototypes inside freezer maintained at or below−26° C. (phcbi Biomedical Freezer, model MDF-U731-PA) for 5 minutes.

(iii) Heating: prototypes were adhered onto the surface of a Teca temperature Control plate set to 53° C. and 65° C. (Teca Cooling and Heating Plate, model AHP-1200CPV) for between 3-5 minutes.

The heterogeneous mixture was coated onto a PET sheet, and each sheet section was observed for color change upon freezing (below 0° C.) and heating (above 50° C.). Images of coated sections were taken on lined white paper as a background in order to demonstrate changes in opacity. Samples appear opaque white at room temperature, and changes dark grey when first frozen below 0° C. (e.g., at −26° C.). When the dark grey frozen sample is heated to 53° C. on the Teca plate, the color changes to black. In an additional example, the color may change to a variety of other colors that may be achieved depending on the memory thermochromic (ink/slurry/pigment) selected, such as black, blue, green, purple, orange and/or red. However, if heating occurs prior to a freeze event, the color changes from opaque white, to transparent/colorless. SCC emulsion which changes from opaque white to transparent when above the threshold temperature. Since transparent colorless appearance remains after heat is removed, a hidden message can be revealed that alerts the user that a heat excursion has taken place. When heated to 65° C. on Teca, the black color is lost, and sample appearance changes to colorless and transparent.

The low temperature ink appears dark colored at room temperature, and therefore must be pre-conditioning at high temperature (e.g., 70° C. for 30 minutes) to change the ink to colorless prior to mixing into the high temperature indicator ink. Additionally, the low temperature ink (appearing colorless, after pre-conditioning) is added in a specific percentage (10-50%) into the high temperature indicator material (SCC polymer water-based emulsion). In this example, 20% of the pre-conditioned low temperature (memory thermochromic water based slurry) was added to the high temperature ink.

In Table 2, the Opaque White information row contains information regarding the color appearance observed (via the human eye and captured in a photograph), and whether the sample appears opaque or transparent after heating or freezing.

In Table 2, the OD Cyan: 0.102 information row contains color density values (measured in OD cyan) obtained using X-Rite 504 Series Spectrodensitometer for each experimental stage of Experiment 2.

The invention claimed is:

1. A combined low temperature and high temperature historical temperature exposure indicator, comprising:
   a substrate;
   a low temperature indicator material supported by the substrate and provided in a first initial color state;
   a high temperature indicator material supported by the substrate and provided in a second initial color state;
      wherein the low temperature indicator material and the high temperature indicator material are combined in a heterogenous mixture;
      wherein the low temperature indicator material is configured to change from the first initial color state to a first exposed color state responsive to the indicator being exposed to a temperature below a low temperature threshold, the low temperature indicator material configured to return from the exposed color state to the initial color state responsive to the low temperature indicator material being subsequently exposed to a temperature above a reset temperature threshold;
      wherein the high temperature indicator material is configured to irreversibly change from the second initial color state to a second exposed color state responsive to the indicator being exposed to a temperature above a high temperature threshold, where the high temperature threshold is lower than the reset temperature threshold.

2. The combined low temperature and high temperature historical temperature exposure indicator of claim 1, wherein the heterogeneous mixture is light colored or opaque in the first initial color state and a dark background area or indicia is provided on the substrate which is masked by the opacity of the heterogeneous mixture in the first initial color state and visible through the heterogeneous mixture when the heterogeneous mixture is exposed to a high temperature excursion.

3. The combined low temperature and high temperature historical temperature exposure indicator of claim 1, wherein the low temperature threshold is in a range from 5° C. to −20° C.

4. The combined low temperature and high temperature historical temperature exposure indicator of claim 1, wherein the high temperature threshold is in a range from 35° C. to 80° C.

5. The combined low temperature and high temperature historical temperature exposure indicator of claim 1, wherein the reset temperature threshold is in a range from 50° C. to 100° C.

6. The combined low temperature and high temperature historical temperature exposure indicator of claim 1, wherein the low temperature indicator material is a memory thermochromic composition that comprises at least one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments.

7. The combined low temperature and high temperature historical temperature exposure indicator of claim 1, wherein the high temperature indicator material comprises a water-based SCC polymer emulsion.

8. The combined low temperature and high temperature historical temperature exposure indicator of claim 1, wherein the substrate includes printed information identifying the location of the low temperature indicator material and the high temperature indicator material on the substrate.

9. The combined low temperature and high temperature historical temperature exposure indicator of claim 1, wherein the exposure indicator, includes a second high temperature indicator material supported by the substrate and provided in a third initial color state; and
      wherein a second high temperature indicator material configured to irreversibly change from the third initial color state to a third exposed color state responsive to the indicator being exposed to a temperature above a second high temperature threshold, wherein the second high temperature threshold is the same or lower than the reset threshold.

10. The combined low temperature and high temperature historical temperature exposure indicator of claim 9, wherein the first high temperature indicator material and the second high temperature indicator material overlay one another on the substrate.

11. The combined low temperature and high temperature historical temperature exposure indicator of claim 9, wherein the first high temperature indicator material, the second high temperature indicator material are located in separate regions on the substrate.

12. The combined low temperature and high temperature historical temperature exposure indicator of claim 9, wherein the second high temperature indicator material comprises a water-based SCC polymer emulsion.

13. The indicator of claim 1, wherein the low temperature indicator material is is microencapsulated separately from the high temperature indicator material.

14. A combined low temperature and high temperature historical temperature exposure indicator, comprising:
   a substrate;
   a low temperature indicator material supported by the substrate and provided in a first initial color state;
   a high temperature indicator material supported by the substrate and provided in a second initial color state; and
   a dark background provided on the substrate behind both the low temperature indicator material and the high temperature indicator material;

wherein at least a portion of the low temperature indicator material overlays at least a portion of the high temperature indicator material;

wherein the low temperature indicator material is configured to change from the first initial color state to a first exposed color state responsive to the indicator being exposed to a temperature below a low temperature threshold, the low temperature indicator material configured to return from the exposed color state to the initial color state responsive to the low temperature indicator material being subsequently exposed to a temperature above a reset temperature threshold;

wherein the high temperature indicator material is configured to irreversibly change from the second initial color state to a second exposed color state responsive to the indicator being exposed to a temperature above a high temperature threshold, where the high temperature threshold is lower than the reset temperature threshold;

wherein the low temperature indicator material is transparent in the first initial color state and dark colored and opaque in the first exposed color state, and wherein the high temperature indicator material is light colored and opaque in the second initial color state and transparent in the second exposed color state, revealing the dark background when both the high temperature indicator material and the low temperature indicator material are transparent, the combined indicator appearing dark after being exposed to either a low temperature excursion below the low temperature threshold or a high temperature excursion above the high temperature threshold.

15. The combined low temperature and high temperature historical temperature exposure indicator of claim 14, wherein a symbol is provided in the dark background that is readable by the human eye, wherein a visual indication provided by the low temperature indicator material affects the appearance of the symbol, and wherein the changed appearance of the low temperature indicator material when exposed to a temperature below a low temperature threshold, provides a different visible indication.

16. The combined low temperature and high temperature historical temperature exposure indicator of claim 15, wherein the background contains an indicia visible after a high temperature excursion, that is hidden after a low temperature excursion or a reset.

17. The indicator of claim 14, wherein the low temperature indicator material is is microencapsulated separately from the high temperature indicator material.

18. A method of creating a combined low temperature and high temperature historical temperature exposure indicator, the method comprising:

receiving a substrate;

receiving a low temperature indicator material configured to transition from a high temperature color state to a low temperature color state responsive to the indicator being exposed to a temperature below a low temperature threshold, the low temperature indicator material configured to return from the low temperature color state to the high temperature color state responsive to the low temperature indicator material being subsequently exposed to a temperature above a reset temperature threshold;

receiving a high temperature indicator material in an initial color state, the high temperature indicator material configured to irreversibly change from the initial color state to an exposed color state responsive to the indicator being exposed to the temperature above a high temperature threshold, where the high temperature threshold is lower than the reset temperature threshold;

forming a heterogenous mixture of the low temperature indicator material and the high temperature indicator material;

applying the heterogenous mixture to the substrate; and maintaining the combined low temperature and high temperature indicator materials at a temperature above the low temperature threshold and below the high temperature threshold.

19. The method of claim 18, wherein the low temperature indicator material is applied in the low temperature color state, and, after application, the low temperature indicator material is exposed to a temperature above the reset temperature, placing it in the high temperature state.

20. The method of claim 19, wherein the low temperature indicator material is applied and exposed to the temperature above the reset temperature, prior to applying the high temperature indicator material.

21. The method of claim 18, wherein the low temperature indicator material is a memory thermochromic composition that comprises at least one of (i) leuco dye (ii) liquid crystal; (iii) wax; (iv) micro-encapsulated dye; (v) an ester; (vi) an alkane; (vii) an organic polymer; (viii) an inorganic material; (ix) a micro-encapsulated leuco-dye; (x) microencapsulated leuco pigments.

22. The method of claim 18, wherein the high temperature indicator material comprises a water-based SCC polymer emulsion.

23. The method of claim 18, wherein the low temperature indicator material is microencapsulated separately from the high temperature indicator material.

* * * * *